US012756516B2

(12) United States Patent
Khoshnevisan et al.

(10) Patent No.: US 12,756,516 B2
(45) Date of Patent: Oct. 6, 2026

(54) REFERENCE SIGNAL CONFIGURATIONS FOR UPLINK BEAM SELECTION

(71) Applicant: QUALCOMM INCORPORATED, San Diego, CA (US)

(72) Inventors: Mostafa Khoshnevisan, San Diego, CA (US); Fang Yuan, Beijing (CN); Wooseok Nam, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 700 days.

(21) Appl. No.: 17/796,854

(22) PCT Filed: Feb. 23, 2021

(86) PCT No.: PCT/CN2021/077420
§ 371 (c)(1),
(2) Date: Aug. 1, 2022

(87) PCT Pub. No.: WO2021/169938
PCT Pub. Date: Sep. 2, 2021

(65) Prior Publication Data
US 2023/0057080 A1 Feb. 23, 2023

(30) Foreign Application Priority Data
Feb. 24, 2020 (WO) ................ PCT/CN2020/076342

(51) Int. Cl.
*H04L 5/00* (2006.01)
*H04W 72/23* (2023.01)

(52) U.S. Cl.
CPC .......... *H04L 5/0051* (2013.01); *H04W 72/23* (2023.01)

(58) Field of Classification Search
None
See application file for complete search history.

(56) References Cited

U.S. PATENT DOCUMENTS

2017/0141901 A1* 5/2017 Rico Alvarino ...... H04L 5/0051
2018/0227094 A1* 8/2018 Liu .................... H04B 7/06966
(Continued)

FOREIGN PATENT DOCUMENTS

CN 109565311 A 4/2019
CN 110034886 A 7/2019
(Continued)

OTHER PUBLICATIONS

Huawei, et al., "Discussion on Panel-Based UL Beam Selection," 3GPP Draft, 3GPP TSG RAN WG1 Meeting #94, R1-1809122, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516491, 7 pages, p. 1, paragraph 2, p. 2, paragraph 3.1, figures 2-4.
(Continued)

*Primary Examiner* — Otis L Thompson, Jr.
(74) *Attorney, Agent, or Firm* — Holland & Hart LLP

(57) ABSTRACT

Methods, systems, and devices for wireless communications are described to support determination of an uplink beam for uplink transmissions. A base station may configure a user equipment (UE) with multiple sets of sounding reference signal (SRS) resources that may be used for uplink transmissions from the UE. In some cases, each set of SRS resources may be configured with one associated channel state information reference signal (CSI-RS) resource, and each CSI-RS resource may correspond to an uplink beam. The base station may transmit a downlink control message to the UE, indicating one or more selected SRS resource sets and one or more selected SRS resources within each of the
(Continued)

one or more selected SRS resource sets. The UE may transmit an uplink transmission with a beam associated with the indicated SRS resource set.

72 Claims, 17 Drawing Sheets

(56) References Cited

U.S. PATENT DOCUMENTS

| | | | | |
|---|---|---|---|---|
| 2019/0044681 | A1* | 2/2019 | Zhang | H04L 5/0094 |
| 2019/0174466 | A1* | 6/2019 | Zhang | H04L 5/0057 |
| 2019/0174527 | A1* | 6/2019 | Park | H04L 5/0046 |
| 2019/0190669 | A1 | 6/2019 | Park et al. | |
| 2019/0190747 | A1* | 6/2019 | Park | H04L 5/0057 |
| 2019/0207731 | A1* | 7/2019 | Park | H04B 7/0456 |
| 2019/0297603 | A1* | 9/2019 | Guo | H04L 5/0053 |
| 2019/0319823 | A1* | 10/2019 | Akkarakaran | H04W 76/27 |
| 2019/0387547 | A1* | 12/2019 | Shin | H04W 48/12 |
| 2020/0036495 | A1* | 1/2020 | Tamrakar | H04L 5/0051 |
| 2020/0083998 | A1* | 3/2020 | Chen | H04B 7/0617 |
| 2020/0100232 | A1* | 3/2020 | Onggosanusi | H04W 72/046 |
| 2020/0106647 | A1* | 4/2020 | Chen | H04W 72/04 |
| 2020/0107353 | A1* | 4/2020 | Jung | H04W 72/23 |
| 2020/0127876 | A1* | 4/2020 | Shi | H04L 25/0226 |
| 2020/0145929 | A1* | 5/2020 | Ryu | H04W 52/242 |
| 2020/0177242 | A1* | 6/2020 | Kim | H04L 5/0051 |
| 2020/0245253 | A1* | 7/2020 | Chen | H04W 52/246 |
| 2020/0280416 | A1* | 9/2020 | Gao | H04L 5/0051 |
| 2020/0329487 | A1* | 10/2020 | Chen | H04W 72/1268 |
| 2020/0336264 | A1* | 10/2020 | Faxér | H04B 7/0617 |
| 2020/0351129 | A1* | 11/2020 | Kwak | H04W 76/27 |
| 2021/0050666 | A1* | 2/2021 | Cirik | H04W 76/38 |
| 2021/0058999 | A1* | 2/2021 | Chen | H04W 76/19 |
| 2021/0211329 | A1* | 7/2021 | Wu | H04L 25/0226 |
| 2021/0288711 | A1* | 9/2021 | Cao | H04B 7/0404 |
| 2021/0298079 | A1* | 9/2021 | Tomeba | H04W 74/0808 |
| 2021/0320774 | A1* | 10/2021 | Park | H04L 5/0023 |
| 2021/0377747 | A1* | 12/2021 | Miao | H04W 16/28 |
| 2022/0070855 | A1* | 3/2022 | Zhang | H04W 72/51 |
| 2022/0224498 | A1* | 7/2022 | Cha | H04W 72/0453 |
| 2022/0263621 | A1* | 8/2022 | Cha | G01S 1/0428 |

FOREIGN PATENT DOCUMENTS

| | | | |
|---|---|---|---|
| CN | 110034889 | A | 7/2019 |
| CN | 110535614 | A | 12/2019 |
| CN | 110574458 | A | 12/2019 |
| EP | 3567783 | A1 | 11/2019 |
| WO | WO-2019068643 | A1 | 4/2019 |
| WO | WO-2019111619 | A1 | 6/2019 |
| WO | WO-2019158186 | A1 | 8/2019 |

OTHER PUBLICATIONS

Samsung: "Corrections on UL Beam Management", 3GPP TSG RAN WG1 Meeting #93, R1-1806719, 3rd Generation Partnership Project, Mobile Competence Centre, 650, Route Des Lucioles, F-06921 Sophia-Antipolis Cedex, France, vol. RAN No. Busan, Korea, May 21, 2018-May 25, 2018, May 20, 2018, XP051441921, 6 pages, p. 2, paragraph 2.2, p. 3, paragraph 2.3.

Supplementary European Search Report—EP21761036—Search Authority—The Hague—Feb. 26, 2024.

ZTE, et al., "Remaining Details on Non-Codebook Based UL Transmission", 3GPP TSG RAN WG1 Meeting 91, R1-1719528, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017, XP051369342, pp. 1-3, p. 1, paragraph 2, figure 2.

CATT: "Discussion on Beam Reporting", 3GPP TSG RAN WG1 Meeting #87, R1-1611385, Reno, USA Nov. 14-18, 2016, 4 Pages.

International Search Report and Written Opinion—PCT/CN2021/077420—ISA/EPO—May 21, 2021.

International Search Report and Written Opinion—PCT/CN2020/076342—ISA/EPO—Dec. 2, 2020.

3GPP: "3rd Generation Partnership Project; Technical Specification Group Radio Access Network; NR; Physical Layer Procedures for Data (Release 16)", 3GPP TS38.214 v16.0.0, NR; Dec. 2019, Technical Specification, Jan. 14, 2020, pp. 1-147.

3GPP: "3rd Generation Partnership Project; Technical Specification Group Radio Access Network; NR; Radio Resource Control (RRC) Protocol Specification (Release 15)", Dec. 2019, Technical Specification, 3GPP TS38.331 v15.8.0, NR; Jan. 7, 2020, pp. 1-533.

LG Electronics: "Feature lead summary#3 of Enhancements on Multi-beam Operations", 3GPP TSG RAN WG1 #98, R1-1909695, Prague, CZ, Aug. 26, 2019-Aug. 30, 2019, Sep. 30, 2019, pp. 1-36.

3GPP: "3rd Generation Partnership Project, Technical Specification Group Radio Access Network, NR, Physical Layer Procedures for Data (Release 15)", 3GPP TS 38.214 V15.8.0, Technical Specification, Dec. 2019, pp. 1-106, Chapters 5.1.6.1.1, 5.1.7.2, 5.2.2.5, 5.2.3, 6.1, 6.1.1.1, 6.1.1.2, 6.1.2.2.1, 6.1.2.3.1, 6.2.1, 6.2.1.2, 6.2.1.3, 6.2.3.1 and 6.2.3.2.

Taiwan Search Report TW110106478 TIPO Nov. 6, 2025.

* cited by examiner

REFERENCE SIGNAL CONFIGURATIONS FOR UPLINK BEAM SELECTION

CROSS REFERENCE

The present application is a 371 national stage filing of International PCT Application No. PCT/CN2021/077420 by KHOSHNEVISAN et al. entitled "REFERENCE SIGNAL CONFIGURATIONS FOR UPLINK BEAM SELECTION," filed Feb. 23, 2021; and claims priority to International Patent Application No. PCT/CN2020/076342 by KHOSHNEVISAN et al., entitled "REFERENCE SIGNAL CONFIGURATIONS FOR UPLINK BEAM SELECTION" and filed Feb. 24, 2020, each of which is assigned to the assignee hereof, and each of which is expressly incorporated by reference herein.

TECHNICAL FIELD

The following relates generally to wireless communications and more specifically to reference signal configurations for uplink beam selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may be configured such that an uplink transmission may be associated with multiple possible uplink transmission beams for directional transmission. However, in some cases, a UE may be configured such that an uplink transmission may be associated with one possible uplink transmission beam, which may reduce uplink transmission quality.

SUMMARY

The described techniques relate to improved methods, systems, devices, and apparatuses that support reference signal configurations for uplink beam selection. For example, a user equipment (UE) and a base station may communicate, and the base station may configure multiple sets of sounding reference signal (SRS) resources that may be used for uplink transmissions from the UE (e.g., multiple sets of SRS resources with usage set to non-codebook). When scheduling an uplink transmission, the base station may indicate one or more sets of SRS resources associated with the uplink transmission and may thereby indicate an uplink beam for the uplink transmission (e.g., the uplink beam associated with the indicated set of SRS resources). For example, described techniques may be used to select and indicate uplink beams for uplink transmissions (e.g., non-codebook based, as one non-limiting example).

The base station may transmit a downlink control message (e.g., downlink control information (DCI)) to the UE, indicating the one or more selected SRS resource sets and one or more selected SRS resources within each of the one or more selected SRS resource sets. The downlink control message may indicate the one or more selected SRS resource sets using a field in the downlink control message or using one or more bits of a field of the downlink control message. The UE may receive the downlink control message and may transmit an uplink transmission based on information received in the downlink control message. For example, the UE may transmit the uplink transmission with a same precoder and spatial domain filter (e.g., same beam) as the indicated SRS resources. Accordingly, the UE may transmit the uplink transmission using a same beam as at least one of the one or more indicated SRS resource sets.

A method of wireless communication is described. The method may include receiving information that indicates a set of SRS resource sets, receiving an indication of a selected SRS resource set, where the selected SRS resource set is included in the set of SRS resource sets, receiving an indication of one or more selected SRS resources, where each selected SRS resource is included in the selected SRS resource set, and transmitting an uplink transmission based on the one or more selected SRS resources and via a beam direction associated with the selected SRS resource set.

An apparatus for wireless communication is described. The apparatus may include at least one processor, memory coupled (e.g., communicatively, operatively, electronically, or otherwise) to the at least one processor, and instructions stored in the memory. The instructions may be executable by the at least one processor to cause the apparatus to receive information that indicates a set of SRS resource sets, receive an indication of a selected SRS resource set, where the selected SRS resource set is included in the set of SRS resource sets, receive an indication of one or more selected SRS resources, where each selected SRS resource is included in the selected SRS resource set, and transmit an uplink transmission based on the one or more selected SRS resources and via a beam direction associated with the selected SRS resource set.

Another apparatus for wireless communication is described. The apparatus may include means for receiving information that indicates a set of SRS resource sets, receiving an indication of a selected SRS resource set, where the selected SRS resource set is included in the set of SRS resource sets, receiving an indication of one or more selected SRS resources, where each selected SRS resource is included in the selected SRS resource set, and transmitting an uplink transmission based on the one or more selected SRS resources and via a beam direction associated with the selected SRS resource set.

A non-transitory computer-readable medium storing code for wireless communication is described. The code may include instructions executable by at least one processor to receive information that indicates a set of SRS resource sets, receive an indication of a selected SRS resource set, where the selected SRS resource set is included in the set of SRS resource sets, receive an indication of one or more selected SRS resources, where each selected SRS resource is included in the selected SRS resource set, and transmit an uplink transmission based on the one or more selected SRS resources and via a beam direction associated with the selected SRS resource set.

Some examples of the method, apparatuses, and non-transitory computer-readable medium described herein may further include operations, features, means, or instructions for receiving information that indicates a set of downlink reference signal resources, where each of the set of SRS resource sets is associated with a respective downlink reference signal resource of the set of downlink reference signal resources.

In some examples of the method, apparatuses, and non-transitory computer-readable medium described herein, the beam direction may correspond to a respective downlink reference signal resource, of the set of downlink reference signal resources, that is associated with the selected SRS resource set.

Some examples of the method, apparatuses, and non-transitory computer-readable medium described herein may further include operations, features, means, or instructions for transmitting one or more SRSs over each of the set of SRS resource sets, where receiving the indication of the selected SRS resource set and the indication of the one or more selected SRS resources may be based on transmitting the one or more SRSs.

In some examples of the method, apparatuses, and non-transitory computer-readable medium described herein, receiving the indication of the selected SRS resource set and receiving the indication of the one or more selected SRS resources may include operations, features, means, or instructions for receiving a downlink control information message, where a first field of the downlink control information message includes the indication of the selected SRS resource set, and where a second field of the downlink control information message includes the indication of the one or more selected SRS resources.

Some examples of the method, apparatuses, and non-transitory computer-readable medium described herein may further include operations, features, means, or instructions for determining a quantity of selected SRS resource sets based on a value of the first field, and ignoring one or more additional fields of the downlink control information message that may be associated with selected SRS resources based on determining the quantity of selected SRS resource sets.

In some examples of the method, apparatuses, and non-transitory computer-readable medium described herein, receiving the indication of the selected SRS resource set and receiving the indication of the one or more selected SRS resources may include operations, features, means, or instructions for receiving a downlink control information message, where a first set of bits within a field of the downlink control information message includes the indication of the selected SRS resource set, and where a second set of bits within the field of the downlink control information message includes the indication of the one or more selected SRS resources.

In some examples of the method, apparatuses, and non-transitory computer-readable medium described herein, the first set of bits may be more significant than the second set of bits.

In some examples of the method, apparatuses, and non-transitory computer-readable medium described herein, each of the set of SRS resource sets includes a respective quantity of SRS resources, and a quantity of bits included in the indication of the one or more selected SRS resources may be based on a largest respective quantity of SRS resources.

In some examples of the method, apparatuses, and non-transitory computer-readable medium described herein, receiving the indication of the selected SRS resource set and receiving the indication of the one or more selected SRS resources may include operations, features, means, or instructions for receiving a downlink control information message including a grant for the uplink transmission, where the uplink transmission may be transmitted based on the grant.

In some examples of the method, apparatuses, and non-transitory computer-readable medium described herein, each of the set of downlink reference signal resource sets corresponds to a respective beam direction.

Some examples of the method, apparatuses, and non-transitory computer-readable medium described herein may further include operations, features, means, or instructions for receiving the respective downlink reference signal resource using a spatial domain transmission filter, where transmitting the uplink transmission via the beam direction corresponding to the respective downlink reference signal resource includes transmitting the uplink transmission using the spatial domain transmission filter.

In some examples of the method, apparatuses, and non-transitory computer-readable medium described herein, the one or more selected SRS resources correspond to one or more respective transmission layers, and transmitting the uplink transmission based on the one or more selected SRS resources may include operations, features, means, or instructions for transmitting the uplink transmission via the one or more respective transmission layers.

Some examples of the method, apparatuses, and non-transitory computer-readable medium described herein may further include operations, features, means, or instructions for receiving an indication of a second selected SRS resource set, where the second selected SRS resource set may be included in the set of SRS resource sets, receiving an indication of one or more second selected SRS resources, where each second selected SRS resource may be included in the second selected SRS resource set, and transmitting the uplink transmission based on the one or more second selected SRS resources and via a second beam direction associated with the second selected SRS resource set.

In some examples of the method, apparatuses, and non-transitory computer-readable medium described herein, the second beam direction may correspond to a second respective downlink reference signal resource, of the plurality of downlink reference signal resources, that is associated with the second selected sounding reference signal resource set.

In some examples of the method, apparatuses, and non-transitory computer-readable medium described herein, the indication of the selected SRS resource set, the indication of the one or more selected SRS resources, the indication of the second selected SRS resource set, and the indication of the one or more second selected SRS resources may be received within a grant for the uplink transmission, and the grant for the uplink transmission schedules multiple occasions of the uplink transmission.

In some examples of the method, apparatuses, and non-transitory computer-readable medium described herein, a first set of one or more occasions of the uplink transmission may be transmitted via the beam direction and based on the one or more selected SRS resources, and a second set of one or more occasions of the uplink transmission may be transmitted via the second beam direction and based on the one or more second selected SRS resources.

In some examples of the method, apparatuses, and non-transitory computer-readable medium described herein, an occasion of the uplink transmission included in the second set may be transmitted after a first occasion of the uplink transmission included in the first set and before a second occasion of the uplink transmission included in the first set.

In some examples of the method, apparatuses, and non-transitory computer-readable medium described herein, the one or more selected SRS resources includes a first quantity of reference signal resources and the one or more second selected SRS resources includes a second quantity of reference signal resources that may be smaller than the first quantity, and the indication of the selected SRS resource set, the indication of the one or more selected SRS resources, the indication of the second selected SRS resource set, and the indication of the one or more second selected SRS resources may be received within a downlink control information message.

Some examples of the method, apparatuses, and non-transitory computer-readable medium described herein may further include operations, features, means, or instructions for identifying, within a field of the downlink control information message, an indication of a set of antenna ports, associating the set of antenna ports with the one or more selected SRS resources, where the uplink transmission in the first set of one or more occasions may be transmitted based on the set of antenna ports, and associating a subset of the set of antenna ports with the one or more second selected SRS resources, where the uplink transmission in the second set of one or more occasions may be transmitted based on the subset of the set of antenna ports.

In some examples of the method, apparatuses, and non-transitory computer-readable medium described herein, the uplink transmission may be transmitted via the beam direction and via the second beam direction within a same transmission time interval.

In some examples of the method, apparatuses, and non-transitory computer-readable medium described herein, the beam direction may be associated with a first transmission and reception point or a first panel, and the second beam direction may be associated with a second transmission and reception point or a second panel.

In some examples of the method, apparatuses, and non-transitory computer-readable medium described herein, the indication of the selected SRS resource set, the indication of the one or more selected SRS resources, the indication of the second selected SRS resource set, and the indication of the one or more second selected SRS resources may be received within a downlink control information message, a first field of the downlink control information message indicates the selected SRS resource set and the second selected SRS resource set, a second field of the downlink control information message indicates the one or more selected SRS resources, and a third field of the downlink control information message indicates the one or more second selected SRS resources.

In some examples of the method, apparatuses, and non-transitory computer-readable medium described herein, the indication of a selected SRS resource set, the indication of the one or more selected SRS resources, the indication of the second selected SRS resource set, and the indication of the one or more second selected SRS resources may be received within a field of a downlink control information message, a first set of bits within the field indicates the selected SRS resource set and the second selected SRS resource set, and a second set of bits within the field indicates the one or more selected SRS resources and the one or more second selected SRS resources.

In some examples of the method, apparatuses, and non-transitory computer-readable medium described herein, the first set of bits may be more significant than the second set of bits.

In some examples of the method, apparatuses, and non-transitory computer-readable medium described herein, the one or more selected SRS resources and the one or more second selected SRS resources each include a same quantity of reference signal resources.

In some examples of the method, apparatuses, and non-transitory computer-readable medium described herein, the uplink transmission includes a physical uplink shared channel transmission.

In some examples of the method, apparatuses, and non-transitory computer-readable medium described herein, the set of downlink reference signal resources includes a set of channel state information reference signal resources.

A method of wireless communication is described. The method may include transmitting information that indicates a set of SRS resource sets, transmitting an indication of a selected SRS resource set, where the selected SRS resource set is included in the set of SRS resource sets, transmitting an indication of one or more selected SRS resources, where each selected SRS resource is included in the selected SRS resource set, and receiving an uplink transmission based on the one or more selected SRS resources and via a beam direction associated with the selected SRS resource set.

An apparatus for wireless communication is described. The apparatus may include at least one processor, memory coupled (e.g., communicatively, operatively, electronically, or otherwise) to the at least one processor, and instructions stored in the memory. The instructions may be executable by the at least one processor to cause the apparatus to transmit information that indicates a set of SRS resource sets, transmit an indication of a selected SRS resource set, where the selected SRS resource set is included in the set of SRS resource sets, transmit an indication of one or more selected SRS resources, where each selected SRS resource is included in the selected SRS resource set, and receive an uplink transmission based on the one or more selected SRS resources and via a beam direction associated with the selected SRS resource set.

Another apparatus for wireless communication is described. The apparatus may include means for transmitting information that indicates a set of SRS resource sets, transmitting an indication of a selected SRS resource set, where the selected SRS resource set is included in the set of SRS resource sets, transmitting an indication of one or more selected SRS resources, where each selected SRS resource is included in the selected SRS resource set, and receiving an uplink transmission based on the one or more selected SRS resources and via a beam direction associated with the selected SRS resource set.

A non-transitory computer-readable medium storing code for wireless communication is described. The code may include instructions executable by at least one processor to transmit information that indicates a set of SRS resource sets, transmit an indication of a selected SRS resource set, where the selected SRS resource set is included in the set of SRS resource sets, transmit an indication of one or more selected SRS resources, where each selected SRS resource is included in the selected SRS resource set, and receive an uplink transmission based on the one or more selected SRS resources and via a beam direction associated with the selected SRS resource set.

Some examples of the method, apparatuses, and non-transitory computer-readable medium described herein may further include operations, features, means, or instructions for transmitting information that indicates a set of downlink reference signal resources, where each of the set of SRS resource sets is associated with a respective downlink reference signal resource of the set of downlink reference signal resources.

In some examples of the method, apparatuses, and non-transitory computer-readable medium described herein, the beam direction may correspond to a respective downlink reference signal resource, of the set of downlink reference signal resources, that is associated with the selected SRS resource set.

Some examples of the method, apparatuses, and non-transitory computer-readable medium described herein may further include operations, features, means, or instructions for receiving one or more SRSs over each of the set of SRS resource sets, and determining the selected SRS resource set and the one or more selected SRS resources based on the one or more SRSs.

In some examples of the method, apparatuses, and non-transitory computer-readable medium described herein, transmitting the indication of the selected SRS resource set and transmitting the indication of the one or more selected SRS resources may include operations, features, means, or instructions for transmitting a downlink control information message, where a first field of the downlink control information message includes the indication of the selected SRS resource set, and where a second field of the downlink control information message includes the indication of the one or more selected SRS resources.

Some examples of the method, apparatuses, and non-transitory computer-readable medium described herein may further include operations, features, means, or instructions for determining a quantity of selected SRS resource sets, and padding one or more additional fields of the downlink control information message that may be associated with selected SRS resources based on determining the quantity of selected SRS resource sets.

In some examples of the method, apparatuses, and non-transitory computer-readable medium described herein, transmitting the indication of the selected SRS resource set and transmitting the indication of the one or more selected SRS resources may include operations, features, means, or instructions for transmitting a downlink control information message, where a first set of bits within a field of the downlink control information message includes the indication of the selected SRS resource set, and where a second set of bits within the field of the downlink control information message includes the indication of the one or more selected SRS resources.

In some examples of the method, apparatuses, and non-transitory computer-readable medium described herein, the first set of bits may be more significant than the second set of bits.

In some examples of the method, apparatuses, and non-transitory computer-readable medium described herein, each of the set of SRS resource sets includes a respective quantity of SRS resources, and a quantity of bits included in the indication of the one or more selected SRS resources may be based on a largest respective quantity of SRS resources.

In some examples of the method, apparatuses, and non-transitory computer-readable medium described herein, transmitting the indication of the selected SRS resource set and transmitting the indication of the one or more selected SRS resources may include operations, features, means, or instructions for transmitting a downlink control information message including a grant for the uplink transmission, where the uplink transmission may be transmitted based on the grant.

In some examples of the method, apparatuses, and non-transitory computer-readable medium described herein, each of the set of downlink reference signal resource sets corresponds to a respective beam direction.

Some examples of the method, apparatuses, and non-transitory computer-readable medium described herein may further include operations, features, means, or instructions for transmitting the respective downlink reference signal resource using a spatial domain transmission filter, where receiving the uplink transmission via the beam direction corresponding to the respective downlink reference signal resource includes receiving the uplink transmission using the spatial domain transmission filter.

In some examples of the method, apparatuses, and non-transitory computer-readable medium described herein, the one or more selected SRS resources correspond to one or more respective transmission layers, and receiving the uplink transmission based on the one or more selected SRS resources may include operations, features, means, or instructions for receiving the uplink transmission via the one or more respective transmission layers.

Some examples of the method, apparatuses, and non-transitory computer-readable medium described herein may further include operations, features, means, or instructions for transmitting an indication of a second selected SRS resource set, where the second selected SRS resource set may be included in the set of SRS resource sets, transmitting an indication of one or more second selected SRS resources, where each second selected SRS resource may be included in the second selected SRS resource set, and receiving the uplink transmission based on the one or more second selected SRS resources and via a second beam direction associated with the second selected SRS resource set.

In some examples of the method, apparatuses, and non-transitory computer-readable medium described herein, the second beam direction may correspond to a second respective downlink reference signal resource, of the plurality of downlink reference signal resources, that is associated with the second selected sounding reference signal resource set.

In some examples of the method, apparatuses, and non-transitory computer-readable medium described herein, the indication of the selected SRS resource set, the indication of the one or more selected SRS resources, the indication of the second selected SRS resource set, and the indication of the one or more second selected SRS resources may be transmitted within a grant for the uplink transmission, and the grant for the uplink transmission schedules multiple occasions of the uplink transmission.

In some examples of the method, apparatuses, and non-transitory computer-readable medium described herein, a first set of one or more occasions of the uplink transmission may be received via the beam direction and based on the one or more selected SRS resources, and a second set of one or more occasions of the uplink transmission may be received via the second beam direction and based on the one or more second selected SRS resources.

In some examples of the method, apparatuses, and non-transitory computer-readable medium described herein, an occasion of the uplink transmission included in the second set may be received after a first occasion of the uplink transmission included in the first set and before a second occasion of the uplink transmission included in the first set.

In some examples of the method, apparatuses, and non-transitory computer-readable medium described herein, the one or more selected SRS resources includes a first quantity of reference signal resources and the one or more second selected SRS resources includes a second quantity of reference signal resources that may be smaller than the first quantity, and the indication of the selected SRS resource set, the indication of the one or more selected SRS resources, the indication of the second selected SRS resource set, and the indication of the one or more second selected SRS resources may be received within a downlink control information message.

Some examples of the method, apparatuses, and non-transitory computer-readable medium described herein may further include operations, features, means, or instructions for including, within a field of the downlink control information message, an indication of a set of antenna ports, where the uplink transmission in the first set of one or more occasions may be based on the set of antenna ports, and where the uplink transmission in the second set of one or more occasions may be based on the subset of the set of antenna ports.

In some examples of the method, apparatuses, and non-transitory computer-readable medium described herein, the uplink transmission may be received via the beam direction and via the second beam direction within a same transmission time interval.

In some examples of the method, apparatuses, and non-transitory computer-readable medium described herein, the beam direction may be associated with a first transmission and reception point or a first panel, and the second beam direction may be associated with a second transmission and reception point or a second panel.

In some examples of the method, apparatuses, and non-transitory computer-readable medium described herein, the indication of the selected SRS resource set, the indication of the one or more selected SRS resources, the indication of the second selected SRS resource set, and the indication of the one or more second selected SRS resources may be transmitted within a downlink control information message, a first field of the downlink control information message indicates the selected SRS resource set and the second selected SRS resource set, a second field of the downlink control information message indicates the one or more selected SRS resources, and a third field of the downlink control information message indicates the one or more second selected SRS resources.

In some examples of the method, apparatuses, and non-transitory computer-readable medium described herein, the indication of a selected SRS resource set, the indication of the one or more selected SRS resources, the indication of the second selected SRS resource set, and the indication of the one or more second selected SRS resources may be transmitted within a field of a downlink control information message, a first set of bits within the field indicates the selected SRS resource set and the second selected SRS resource set, and a second set of bits within the field indicates the one or more selected SRS resources and the one or more second selected SRS resources.

In some examples of the method, apparatuses, and non-transitory computer-readable medium described herein, the first set of bits may be more significant than the second set of bits.

In some examples of the method, apparatuses, and non-transitory computer-readable medium described herein, the one or more selected SRS resources and the one or more second selected SRS resources each include a same quantity of reference signal resources.

In some examples of the method, apparatuses, and non-transitory computer-readable medium described herein, the uplink transmission includes a physical uplink shared channel transmission.

In some examples of the method, apparatuses, and non-transitory computer-readable medium described herein, the set of downlink reference signal resources includes a set of channel state information reference signal resources.

DETAILED DESCRIPTION

Figure 1:
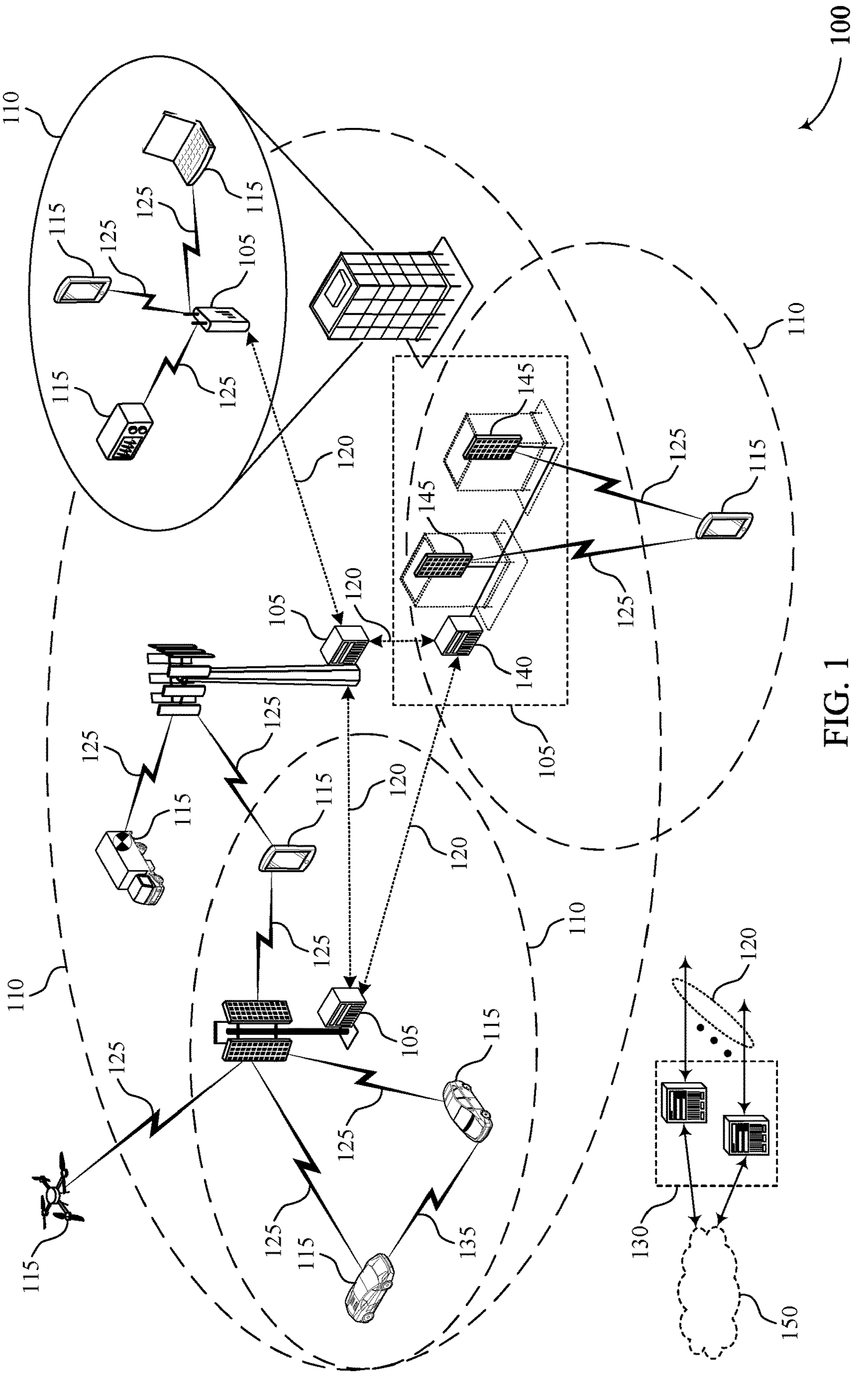
FIG. 1 illustrates an example of a wireless communications system that supports reference signal configurations for uplink beam selection in accordance with aspects of the present disclosure.

A user equipment (UE) may transmit an uplink transmission to a base station. In some cases, the base station may refrain from configuring the UE with both spatial relation information and channel state information reference signal (CSI-RS) resources for a set of sounding reference signal (SRS) resources. The spatial relation information may provide a spatial relation between an indicated reference signal and a target SRS to determine an uplink beam for the target SRS.

In some cases, the base station may configure the UE with a CSI-RS resource in order to calculate a precoder for a set of SRS resources, and may therefore not configure the UE with spatial relation information for the set of SRS resources. If spatial relation information is not configured for the set of SRS resources, the UE may be restricted to use a single uplink beam for the SRS resource set and any corresponding uplink transmission(s), where the uplink beam may be based on the CSI-RS resource. In order to change the uplink beam, radio resource control (RRC) signaling may indicate a change in a transmission configuration indicator (TCI) for the corresponding CSI-RS, or another CSI-RS resource set may be configured, which may both be relatively slow types of communications. Uplink transmission quality may be reduced by having a reduced set of possible uplink beams.

The proposed techniques provide for the base station to configure multiple sets of SRS resources that may be used for uplink transmissions from the UE, including non-codebook based uplink transmissions as just one non-limiting example (e.g., multiple sets of SRS resources with usage set to non-codebook). When scheduling an uplink transmission, the base station may indicate one or more sets of SRS resources associated with the uplink transmission and may thereby indicate an uplink beam for the uplink transmission (e.g., the uplink beam corresponding to a CSI-RS resource that is associated with the indicated set of SRS resources).

The base station may transmit a downlink control message (e.g., downlink control information (DCI)) to the UE, indicating the one or more selected SRS resource sets and one or more selected SRS resources within each of the one or more selected SRS resource sets. The downlink control message may indicate the one or more selected SRS resource sets using a field in the downlink control message or using one or more bits of a field of the downlink control message. The UE may receive the downlink control message and may transmit an uplink transmission based on information received in the downlink control message. For example, the UE may transmit the uplink transmission with a same precoder and spatial domain filter (e.g., same beam) as the indicated SRS resources. Accordingly, the UE may transmit the uplink transmission using a same beam as at least one of the one or more indicated SRS resource sets. In some cases, each set of SRS resources may be configured with one associated CSI-RS resource, and each CSI-RS resource may correspond to an uplink beam.

Aspects of the disclosure are initially described in the context of wireless communications systems. Aspects of the disclosure are further illustrated by and described with reference to a reference signal configuration, a communication scheme, a process flow, apparatus diagrams, system diagrams, and flowcharts that relate to reference signal configurations for uplink beam selection.

FIG. 1 illustrates an example of a wireless communications system 100 that supports reference signal configurations for uplink beam selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 and a base station 105 may communicate using uplink transmissions (e.g., non-codebook-based uplink transmissions), and the base station 105 may configure multiple sets of SRS resources that may be used for uplink transmissions from the UE 115 (e.g., non-codebook-based transmissions). When scheduling an uplink transmission, the base station 105 may indicate one or more sets of SRS resources associated with the uplink transmission and may thereby indicate an uplink beam for the uplink transmission (e.g., in the example of non-codebook-based uplink transmissions, multiple sets of SRS resources may be configured with usage set to non-codebook. and the indicated uplink beam may correspond to a CSI-RS resource that is associated with the indicated set of SRS resources).

The base station 105 may transmit a downlink control message to the UE 115, indicating the one or more selected SRS resource sets and one or more selected SRS resources within each of the one or more selected SRS resource sets. The downlink control message may indicate the one or more selected SRS resource sets using a field in the downlink control message or using one or more bits of a field of the downlink control message. The UE 115 may receive the downlink control message and may transmit an uplink transmission based on information received in the downlink control message. For example, the UE 115 may transmit the uplink transmission with a same precoder and spatial domain filter (e.g., same beam) as the indicated SRS resources. Accordingly, the UE 115 may transmit the uplink transmission using a same beam as at least one of the one or more indicated SRS resource sets.

Figure 2:
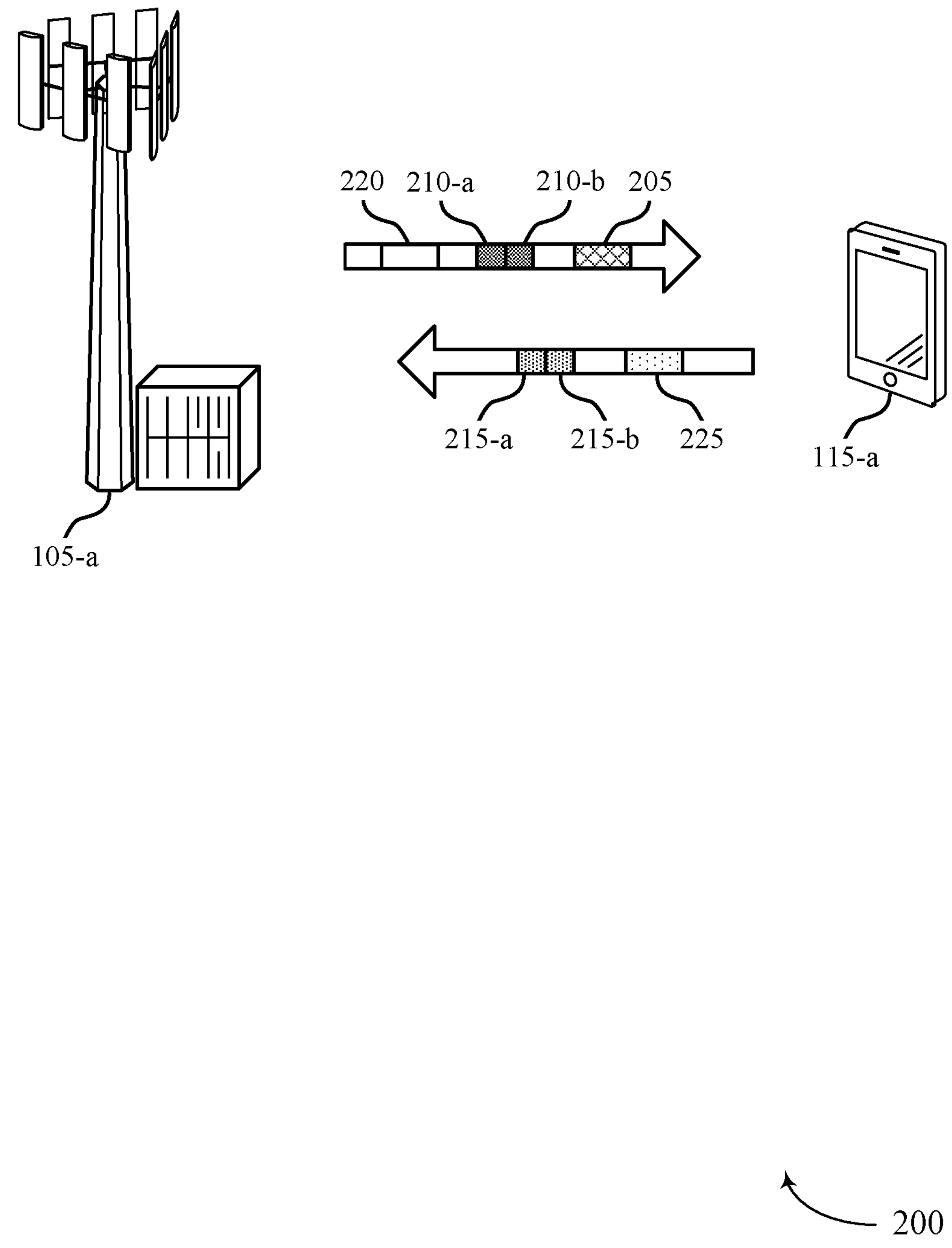
FIG. 2 illustrates an example of a wireless communications system that supports reference signal configurations for uplink beam selection in accordance with aspects of the present disclosure.

FIG. 2 illustrates an example of a wireless communications system 200 that supports reference signal configurations for uplink beam selection in accordance with aspects of the present disclosure. In some examples, wireless communications system 200 may implement aspects of wireless communications system 100. For example, wireless communications system 200 may include a base station 105-*a* and a UE 115-*a*, which may represent examples of a base station 105 and a UE 115 described with reference to FIG. 1. As described herein, base station 105-*a* may configure UE 115-*a* with SRS resources, UE 115-*a* may transmit SRS using the SRS resources, and base station 105-*a* may indicate one or more SRS resources for an associated uplink transmission.

In some examples, UE 115-*a* and base station 105-*a* may communicate according to non-codebook based uplink transmissions. Base station 105-*a* may, in some cases, refrain from configuring UE 115-*a* with both spatial relation information (e.g., SpatialRelationInfo) and CSI-RS resources 210 for a set of SRS resources 215. The spatial relation information may provide a spatial relation between an indicated reference signal (e.g., a synchronization signal block (SSB), CSI-RS, or SRS) and a target SRS resource within the set of SRS resources to determine an uplink beam for the target SRS resource. In one example, base station 105-*a* may configure UE 115-*a* with a CSI-RS resource 210 in order to calculate a precoder for a set of SRS resources 215, and may therefore not configure UE 115-*a* with spatial relation information for any of the SRS resources in the set of SRS resources 215.

The proposed techniques provide for base station 105-*a* to configure multiple sets of SRS resources 215 that may be used for uplink transmissions from UE 115-*a* (e.g., non-codebook based uplink transmissions, in which case multiple sets of SRS resources 215 may be configured with usage set to non-codebook). In some cases, each set of SRS resources 215 may be configured with one associated CSI-RS resource 210 (e.g., a non-zero power (NZP) CSI-RS resource 210), and each CSI-RS resource 210 may correspond to an uplink beam. When scheduling an uplink transmission 225, base station 105-*a* may indicate one or more sets of SRS resources 215 associated with the uplink transmission 225 and may thereby indicate an uplink beam for the uplink transmission 225 (e.g., the uplink beam corresponding to the CSI-RS resource 210 that is associated with the indicated set of SRS resources 215, or the uplink beam otherwise associated with the indicated set of SRS resources 215).

In one example, base station 105-*a* may transmit a configuration message 205 to UE 115-*a* (e.g., via RRC signaling). The configuration message 205 may indicate multiple sets of SRS resources 215 configured for uplink transmissions from UE 115-*a*. For example, the configuration message 205 may indicate SRS resource sets 215-*a* and 215-*b*, and, in some cases, may indicate CSI-RS resources 210-*a* and 210-*b* (e.g., using RRC parameter associatedCSI-RS) that are respectively associated with SRS resource sets 215-*a* and 215-*b*. In some examples, base station 105-*a* may configure and indicate one set of SRS resources 215 (e.g., and corresponding CSI-RS resources 210), and in some examples, base station 105-*a* may indicate more than two sets of SRS resources 215 (e.g., and corresponding CSI-RS resources 210). In some cases, base station 105-*a* may transmit CSI-RS to UE 115-*a* over the indicated CSI-RS resources 210-*a* and 210-*b*, and UE 115-*a* may measure CSI-RS resources 210-*a* and 210-*b*. UE 115-*a* may use the measurement of channel state information (CSI) resources 210-*a* and 210-*b* to calculate a precoder for SRS resource sets 215-*a* and 215-*b*, respectively.

UE 115-*a* may transmit SRS to base station 105-*a* using SRS resource sets 215-*a* and 215-*b* and may use respective precoders to transmit the SRS. For example, each SRS resource set 215 may include up to four SRS resources, and UE 115-*a* may transmit SRS to base station 105-*a* using each SRS resource in each SRS resource set 215. SRS resources in SRS resource set 215-*a* may be associated with a first precoder (e.g., based on CSI-RS 210-*a*) and SRS resources in SRS resource set 215-*b* may be associated with a second precoder (e.g., based on CSI-RS 210-*b*). Base station 105-*a* may receive the precoded SRS over the SRS resources and may select an SRS resource set 215, and one or more SRS resources within the SRS resource set 215, for an uplink transmission 225. For example, base station 105-*a* may select SRS resource set 215-*b* for uplink transmission 225, based on an uplink beam associated with SRS resource set 215-*b* (e.g., and CSI-RS 210-*b*). Base station 105-*a* may further select one or more SRS resources within SRS resource set 215-*b* for uplink transmission 225.

Base station 105-*a* may transmit a downlink control message 220 (e.g., a DCI) to UE 115-*a*, indicating the selected SRS resource set 215-*b* and the selected SRS resource(s) within SRS resource set 215-*b*. For example, a field of the downlink control message 220 (e.g., an SRS resource indicator (SRI) field) may indicate the one or more selected SRS resources. The downlink control message 220 may further indicate the selected SRS resource set 215-*b* using a different field in the downlink control message 220 or using one or more bits (e.g., most significant bits (MSBs)) of the SRI field of the downlink control message 220. The indicated SRS resource set 215-*b* and SRS resources may be associated with a most recent transmission of SRS (e.g., prior to the downlink control message 220).

UE 115-*a* may receive the downlink control message 220 and may transmit the uplink transmission 225 based on information received in the downlink control message 220. For example, UE 115-*a* may transmit the uplink transmission 225 with a same precoder (e.g., the second precoder) and spatial domain filter (e.g., same beam) as the indicated SRS resources. Accordingly, UE 115-*a* may transmit the uplink transmission 225 using a same beam as the indicated SRS resource set 215-*b*. In some cases, a number of selected SRS resources may determine a rank or a number of layers for the uplink transmission 225. For example, if base station 105-*a* selects two SRS resources and indicates the selected SRS resources to UE 115-*a* via the downlink control message 220, UE 115-*a* may transmit the uplink transmission 225 with two layers.

In some cases, base station 105-*a* may indicate for UE 115-*a* to transmit the uplink transmission 225 using multiple transmission occasions. Accordingly, base station 105-*a* may indicate different uplink beams for different subsets of the transmission occasions. For example, base station 105-*a* may include, within downlink control message 220, an indication of a selected set of SRS resources 215 (e.g., and corresponding SRS resources within the set) for each subset of transmission occasions. As described herein, downlink control message 220 may indicate each of the selected SRS resource sets 215 via a respective field in the downlink control message 220 or using one or more bits (e.g., MSBs) of the SRI field of the downlink control message 220.

Although the examples described herein reference different SRS resource sets 215, the same examples may apply to different SRS resource groups configured within one SRS resource set 215. For example, an SRS resource set 215 may be configured with multiple SRS resource groups. The SRS resource groups may be configured implicitly (e.g., specified via a network configuration or a wireless communications standard) or explicitly (e.g., configured via an RRC configuration). One example of an implicit configuration may include grouping SRS resources within each comb into a corresponding SRS resource group. In some cases, each SRS resource group may be associated with a different CSI-RS resource 210 and corresponding uplink beam. In some cases, each SRS resource group may be associated with a different TCI state (e.g., and corresponding uplink beam) for one CSI-RS resource 210 associated with the SRS resource set 215. For example, a first group of antenna ports for the CSI-RS resource 210 may be associated with a first TCI state (e.g., and a first corresponding uplink beam) and a second group of antenna ports for the CSI-RS resource 210 may be associated with a second TCI state (e.g., and a second corresponding uplink beam).

Base station 105-*a* may indicate one or more selected SRS resource groups, and selected SRS resources within the SRS resource group, using methods described herein with reference to SRS resource sets 215 and resources within the SRS resource set 215. For example, downlink control message 220 may indicate one or more selected SRS resource groups using a respective field in the downlink control message 220 or using one or more bits (e.g., MSBs) of the SRI field of the downlink control message 220. Further examples for selecting one or more SRS resource sets 215 and SRS resources within an SRS resource set 215 are described herein with reference to FIGS. 3-5, and may equally apply to selecting one or more SRS resource groups and SRS resources within an SRS resource group. In some cases, when SRS resource groups are configured, base station 105-*a* may configure an SRS resource set 215 to include more than four SRS resources (e.g., up to 8 or 16 SRS resources).

Figure 3:
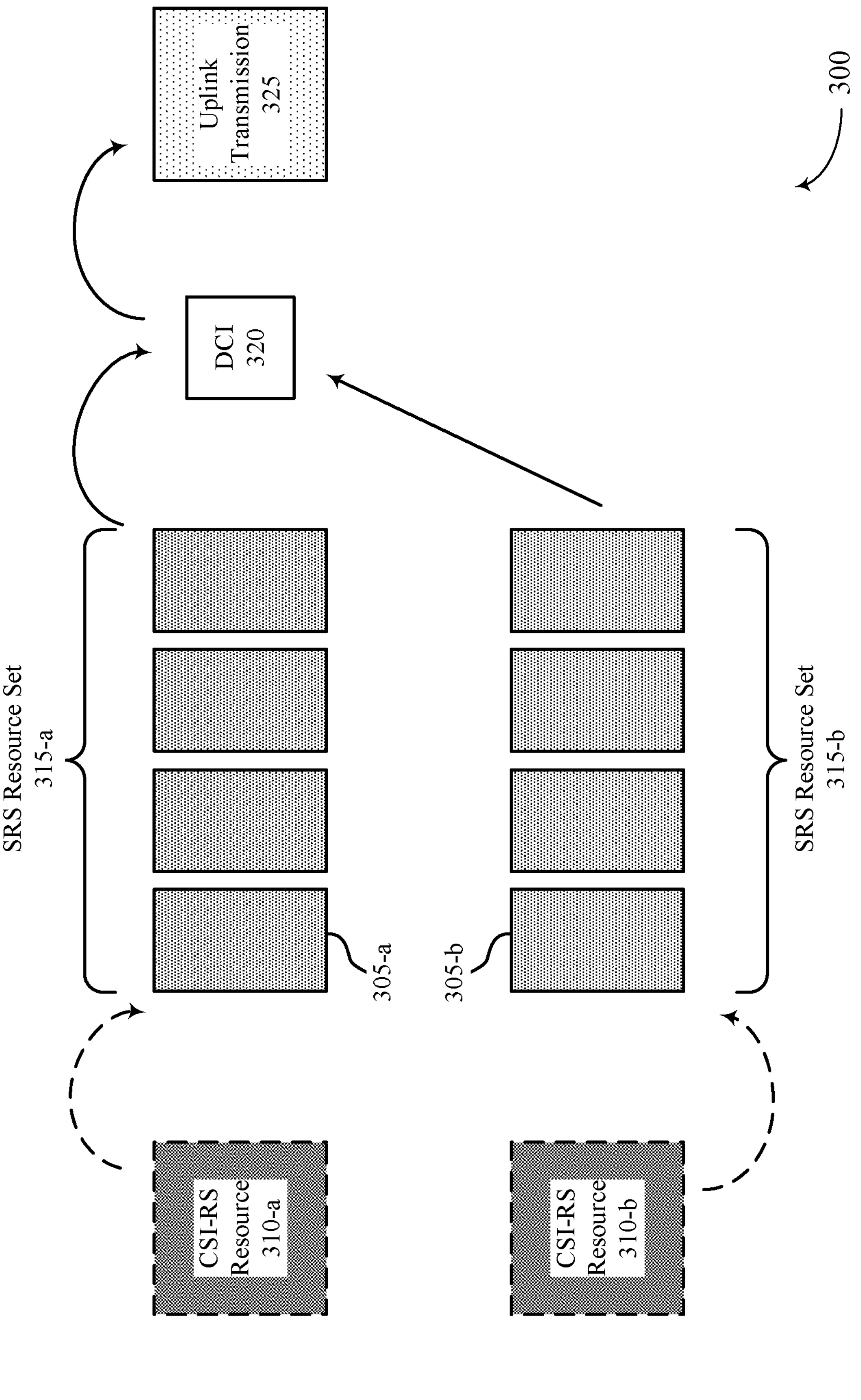
FIG. 3 illustrates an example of a reference signal configuration that supports reference signal configurations for uplink beam selection in accordance with aspects of the present disclosure.

FIG. 3 illustrates an example of a reference signal configuration 300 that supports reference signal configurations for uplink beam selection in accordance with aspects of the present disclosure. In some examples, reference signal configuration 300 may implement aspects of wireless communications system 100 or 200. For example, a base station 105 may use reference signal configuration 300 to select and indicate an uplink beam to a UE 115, where the base station 105 and the UE 115 may be examples of a base station 105 and a UE 115 described with reference to FIGS. 1 and 2.

As described with reference to FIG. 2, the base station 105 may configure multiple sets of SRS resources 315 that may be used for uplink transmissions from the UE 115—such as non-codebook based transmissions, as one example (e.g., sets of SRS resources 315 with usage set to non-codebook). In some cases, each set of SRS resources 315 may be configured with one associated CSI-RS resource 310 (e.g., an NZP CSI-RS resource 310), and each CSI-RS resource 310 may correspond to an uplink beam. In such cases, the base station 105 may transmit CSI-RS to the UE 115 over the indicated CSI-RS resources 310 (e.g., CSI-RS resources 310-*a* and 310-*b*), and the UE 115 may measure the CSI-RS resources 310. The UE 115 may use the measurement of CSI-RS resources 310 to calculate a respective precoder for each SRS resource set 315 (e.g., SRS resource sets 315-*a* and 315-*b*). Although FIG. 3 illustrates two sets of SRS resources 315 and corresponding CSI-RS resources 310, the examples described herein may be extended to any number of SRS resource sets 315 and corresponding CSI-RS resources 310.

The UE 115 may transmit SRS to the base station 105 using the SRS resource sets 315 and may use respective precoders to transmit the SRS. For example, SRS resources 305 in SRS resource set 315-*a* may be associated with a first precoder (e.g., based on CSI-RS 310-*a*) and SRS resources 305 in SRS resource set 315-*b* may be associated with a second precoder (e.g., based on CSI-RS 310-*b*). The base station 105 may receive the precoded SRS over the SRS resources 305 and may select an SRS resource set 315, and one or more SRS resources 305 within the SRS resource set 315, for uplink transmission 325 (which may, as one example, be non-codebook based). The base station 105 may indicate the selected SRS resource set 315 and one or more SRS resources 305 via a DCI 320 (e.g., a downlink control message) that schedules the uplink transmission 325. The UE 115 may receive the DCI 320 and may transmit the uplink transmission 325 based on information received in the DCI 320. For example, the UE 115 may transmit the uplink transmission 325 with a same precoder and spatial domain filter (e.g., same beam) as the indicated SRS resources 305. Accordingly, the UE 115 may transmit the uplink transmission 325 using a same beam as the indicated SRS resource set 315 and corresponding CSI-RS resource.

In a first example, DCI 320 may indicate one selected SRS resource set 315 using a first field in the DCI 320. The field may include a number of bits, where the number of bits may be determined using equation (1):

$$N_{bits} = \lceil \log_2(N_{SRS-Sets}) \rceil, \tag{1}$$

where $N_{bits}$ represents the number of bits in the field and $N_{SRS\text{-}Sets}$ represents a number of SRS resource sets 315 that are configured (e.g., with usage set to non-codebook). The field (e.g., the SRS resource set indicator) may include one bit if two SRS resource sets 315 are configured and may include two bits if four SRS resource sets are configured. A second, separate field (e.g., an SRI field) within the DCI 320 may indicate one or more selected SRS resources 305 within the selected SRS resource set 315.

In a second example, DCI 320 may indicate one selected SRS resource set 315 using one or more bits (e.g., MSBs) of an SRI field of the DCI 320. The SRI field may include a number of bits, where the number of bits may be determined using equation (2):

$$N_{bits} = \lceil \log_2 N_{SRS-Sets} \rceil + \left\lceil \log_2 \left[ \sum_{k=1}^{min\{L_{Max}, N_{SRS}\}} \binom{N_{SRS}}{k} \right] \right\rceil, \tag{2}$$

where $N_{bits}$ represents the number of bits in the SRI field, $N_{SRS\text{-}Sets}$ represents a number of SRS resource sets 315 that are configured (e.g., with usage set to non-codebook), k represents a kth indicated SRS resource 305, $L_{Max}$ represents a maximum number of layers for the uplink transmission 325, and $N_{SRS}$ represents a maximum number of configured SRS resources 305 per SRS resource set 315 (e.g., a largest number of SRS resources 305 across all configured SRS resource sets 315). In one example of equation (2), $\lceil \log_2 N_{SRS\text{-}Sets} \rceil$ may represent a number of MSBs used to indicate the selected SRS resource set 315, and $$\left\lceil \log_2 \left[ \sum_{k=1}^{\min\{L_{Max}, N_{SRS}\}} \binom{N_{SRS}}{k} \right] \right\rceil$$

may represent a number of least significant bits (LSBs) used to indicate one or more selected SRS resources 305 within the selected SRS resource set 315.

In some cases, the base station 105 may indicate for the UE 115 to transmit the uplink transmission 325 using multiple transmission occasions (e.g., multiple repetitions). Accordingly, the base station 105 may indicate different uplink beams for different subsets of the transmission occasions. For example, the base station 105 may include, within DCI 320, an indication of a selected set of SRS resources 315 (e.g., and corresponding SRS resources 305 within the set) for each subset of transmission occasions. Thus, in a third example, DCI 320 may indicate one or more selected SRS resource sets 315 using a field in the DCI 320. The field may include a number of bits, where the number of bits may be determined using equation (3):

$$N_{bits} = \left\lceil \log_2 \left( \sum_{i=1}^{M_{max}} \binom{N_{SRS\text{-}Sets}}{i} \right) \right\rceil, \quad (3)$$

where $N_{bits}$ represents the number of bits in the field, $M_{max}$ represents a maximum number of SRS resource sets 315 that may be indicated by the base station 105 (e.g., $M_{max}=2$), i represents an ith indicated SRS resource set 315, and $N_{SRS\text{-}Sets}$ represents a number of SRS resource sets 315 that are configured (e.g., with usage set to non-codebook). In one example of equation (3), DCI 320 may also include $M_{max}$ SRI fields, where each SRI field may indicate one or more SRS resources 305 within a respective, indicated SRS resource set 315 (e.g., associated with a respective TRP). In some cases, the base station 105 may indicate a number of SRS resource sets 315 that is less than $M_{max}$ (e.g., $i<M_{max}$), in which case, SRI fields beyond the number of indicated SRS resource sets 315 may be ignored by the UE 115 (e.g., the UE 115 may ignore a last $M_{max}-i$ SRI fields), and the base station may, in some cases, fill the ignored fields with dummy bits (which may be referred to as padding those fields or setting the bits in those fields to zero).

In a fourth example, DCI 320 may indicate the one or more selected SRS resource sets 315 using one or more bits (e.g., MSBs) of an SRI field of the DCI 320. The SRI field may include a number of bits, where the number of bits may be determined using equation (4):

$$N_{bits} = \left\lceil \log_2 \left( \sum_{i=1}^{M_{max}} \binom{N_{SRS\text{-}Sets}}{i} \right) \right\rceil + M_{max} * \left\lceil \log_2 \left[ \sum_{k=1}^{\min\{L_{Max}, N_{SRS}\}} \binom{N_{SRS}}{k} \right] \right\rceil, \quad (4)$$

where $N_{bits}$ represents the number of bits in the SRI field, $M_{max}$ represents a maximum number of SRS resource sets 315 that may be indicated by the base station 105 (e.g., $M_{max}=2$), i represents an ith indicated SRS resource set 315, $N_{SRS\text{-}Sets}$ represents a number of SRS resource sets 315 that are configured (e.g., with usage set to non-codebook), k represents a number of indicated SRS resources 305, $L_{Max}$ represents a maximum number of layers for the uplink transmission 325, and $N_{SRS}$ represents a maximum number of configured SRS resources 305 per SRS resource set 315 (e.g., a largest number of SRS resources 305 across all configured SRS resource sets 315). In one example of equation (4), $$\left\lceil \log_2 \left( \sum_{i=1}^{M_{max}} \binom{N_{SRS\text{-}Sets}}{i} \right) \right\rceil$$

may represent a number of MSBs used to indicate the one or more selected SRS resource sets 315, and $$M_{max} * \left\lceil \log_2 \left[ \sum_{k=1}^{\min\{L_{Max}, N_{SRS}\}} \binom{N_{SRS}}{k} \right] \right\rceil$$

may represent a number of LSBs used to indicate one or more selected SRS resources 305 within the one or more selected SRS resource sets 315.

In any example, the number of bits for the SRI field of the DCI 320 may be based on a largest number of SRS resources 305 across all configured SRS resource sets 315 (e.g., $N_{SRS}$) This number of SRS resources 305 may, for example, support size alignment for DCI 320, such that each DCI 320 may have a same size regardless of an amount of SRS resources 305 configured for one or more selected SRS resource sets 315. In some cases, SRS resource sets 315 may be configured such that each SRS resource set 315 includes a same amount of SRS resources 305. For example, SRS resource sets 315 may be restricted to have a same amount of SRS resources 305 by the network or by a wireless communications standard.

In some cases, SRS resource sets 315 may be configured such that each transmission occasion of the uplink transmission 325 is associated with a same number of layers (e.g., same number of indicated SRS resources 305 within each selected SRS resource set). For example, transmission occasions may be restricted to have a same number of layers by the network or by a wireless communications standard. In some cases, having a same number of layers may reduce overhead for the DCI 320, which may otherwise indicate different antenna ports for different numbers of layers and thereby increase a number of fields in the DCI 320. If each transmission occasion of the uplink transmission 325 is associated with a same number of layers, a number of LSBs of an SRI field of the DCI may be given by equation (5):

$$N_{bits} = \left\lceil \log_2 \left[ \sum_{k=1}^{\min\{L_{Max}, N_{SRS}\}} \binom{N_{SRS}}{k}^{M_{max}} \right] \right\rceil, \quad (5)$$

where $N_{bits}$ represents the number of LSBs in the SRI field, k represents a number of indicated SRS resources 305, $L_{Max}$ represents a maximum number of layers for the uplink transmission 325, $N_{SRS}$ represents a maximum number of configured SRS resources 305 per SRS resource set 315 (e.g., a largest number of SRS resources 305 across all configured SRS resource sets 315), and $M_{max}$ represents a maximum number of SRS resource sets 315 that may be indicated by the base station 105 (e.g., $M_{max}$=2). In some examples of equation (5), a number of indicated SRS resources (e.g., k) may not be separately controlled within each of the SRS resource sets 315 (e.g., k is a same value for each SRS resource set 315).

Figure 4:
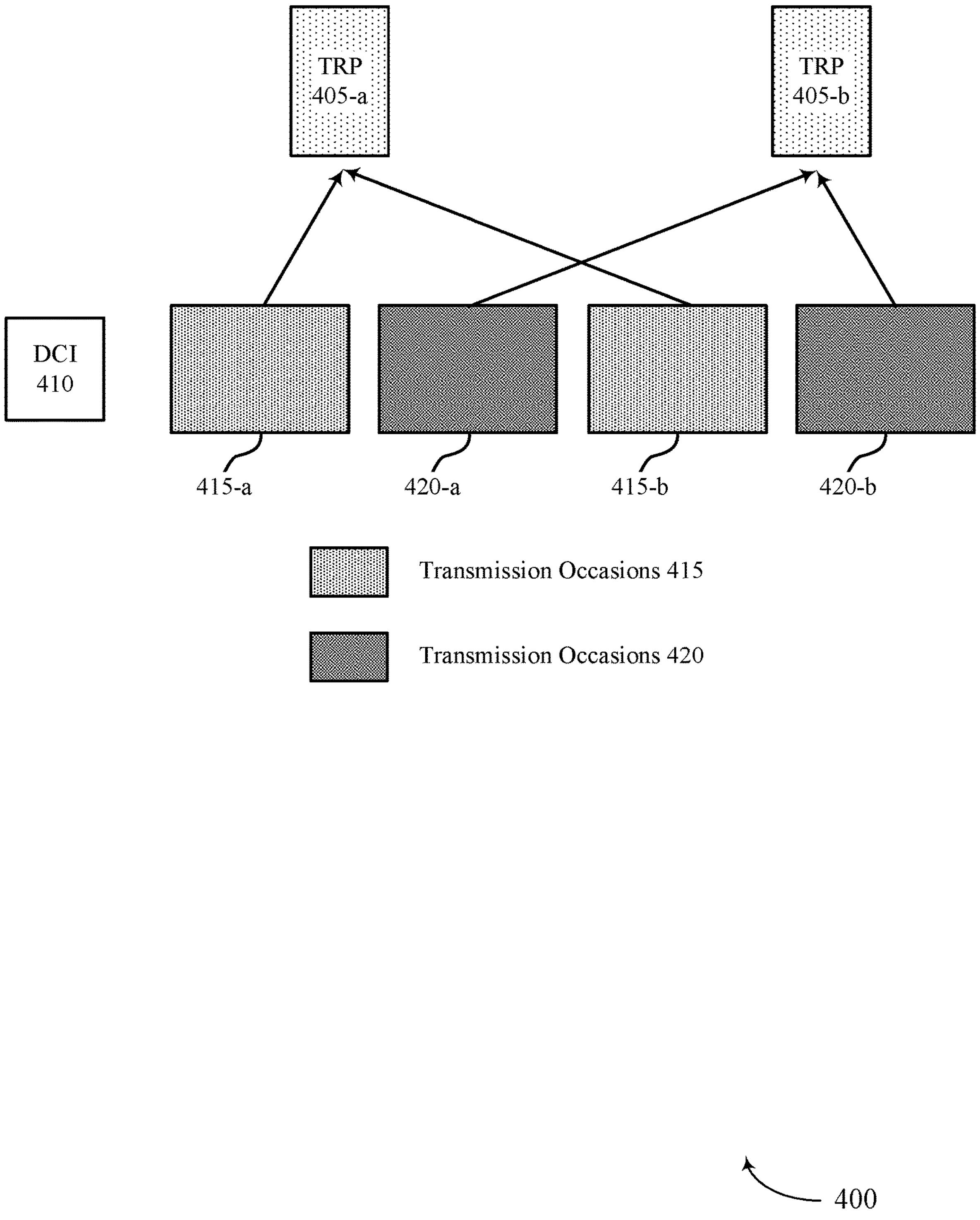
FIG. 4 illustrates an example of a communications scheme that supports reference signal configurations for uplink beam selection in accordance with aspects of the present disclosure.

FIG. 4 illustrates an example of a communication scheme 400 that supports reference signal configurations for uplink beam selection in accordance with aspects of the present disclosure. In some examples, communication scheme 400 may implement aspects of wireless communications system 100 or 200. For example, a UE 115 may use communication scheme 400 to transmit an uplink transmission (which may, in some cases, be non-codebook based) to a base station 105, where the UE 115 and the base station 105 may be examples of a UE 115 and a base station 105 described with reference to FIGS. 1-3. In some cases, the uplink transmission may include multiple transmission occasions (e.g., repetitions). For example, the uplink transmission may include a first set of transmission occasions 415 and a second set of transmission occasions 420. In some cases, the UE 115 may transmit different sets of transmission occasions to different ones of multiple TRPs 405 or to different ones of multiple panels (e.g., to increase transmission diversity) associated with a receiving entity. It is to be understood that any example described herein with reference to a TRP 405 may additionally or alternatively apply to a panel.

In some cases, if one transmission occasion or set of transmission occasions is blocked at one TRP 405 (e.g., one link is blocked), another transmission occasion or set of transmission occasions may be successfully decoded at another TRP 405. Different transmission occasions may be transmitted in a same TTI (e.g., slot) or in a different TTIs and may correspond to a same transport block (TB) of the uplink transmission. A number of repetitions or transmission occasions may be RRC configured by the base station 105 or may indicated dynamically by the base station 105 (e.g., via a time domain resource allocation (TDRA) field in a DCI). Because the different transmission occasions may be transmitted to different TRPs 405, different beams may support transmission diversity at the different TRPs 405. For example, transmission occasions 415 may be directed to TRP 405-*a* and transmission occasions 420 may be directed to TRP 405-*b*.

As described with reference to FIGS. 2 and 3, the base station 105 may configure multiple sets of SRS resources that may be used for uplink transmissions from the UE 115 (e.g., non-codebook based transmission, in which case multiple sets of SRS resources may be configured with usage set to non-codebook). In some cases, such as non-codebook based examples, each set of SRS resources may be configured with one associated CSI-RS resource (e.g., an NZP CSI-RS resource), and each CSI-RS resource may correspond to an uplink beam. The UE 115 may transmit SRS to the base station 105 using the SRS resource sets and may use respective precoders to transmit the SRS (e.g., based on respective CSI-RS resources). The base station 105 may receive the precoded SRS and may select one or more SRS resource sets, and one or more SRS resources within a selected SRS resource set, for the uplink transmission.

The base station 105 may, for example, select different uplink beams for different sets of the transmission occasions (e.g., select different beams for transmission occasions 415 and 420, respectively), where each uplink beam may be associated with an SRS resource set (e.g., and corresponding CSI-RS resource). For example, the base station 105 may associate a first SRS resource set with transmission occasions 415 and may associate a second SRS resource set with transmission occasions 420. A first uplink beam may be used for transmission occasions 415, where, in some cases, the first uplink beam may represent a same spatial domain transmission filter used for reception of the CSI-RS resource associated with the first SRS resource set. A second uplink beam may be used for transmission occasions 420, where, in some cases, the second uplink beam may represent a same spatial domain transmission filter used for reception of the CSI-RS resource associated with the second SRS resource set. The base station 105 may include, within a DCI 410 scheduling the uplink transmission, an indication of a selected set of SRS resources (e.g., and corresponding SRS resources within the set) for each subset of transmission occasions.

The base station 105 may indicate the selected SRS resource set and SRS resources using methods described with reference to FIG. 3. For example, DCI 410 may indicate selected SRS resource sets using a respective field in the DCI 410 or using one or more bits (e.g., MSBs) of an SRI field of the DCI. In some cases, as described with reference to FIG. 3, SRS resource sets may be configured such that each transmission occasion of the uplink transmission is associated with a same number of layers (e.g., SRS resources). In some cases, SRS resource sets may be configured such that sets of transmission occasions of the uplink transmission may be associated with a different number of layers (e.g., SRS resources). Each set of transmission occasions may be associated with some antenna ports, and the antenna ports may be different for each set of transmission occasions.

In some cases, the base station 105 may indicate the antenna ports for each set of transmission occasions using one field in the DCI 410. For example, an antenna ports field in the DCI 410 may indicate demodulation reference signal (DMRS) ports corresponding to an SRS resource set (e.g., and corresponding set of transmission occasions) associated with a largest number of indicated SRS resources (e.g., largest number of layers). Another set of transmission occasions may use a subset of the indicated DMRS ports starting from a first indicated DMRS port.

In one example, the DCI 410 may indicate a first SRS resource set for transmission occasions 415 and a second SRS resource set for transmission occasions 420. The DCI 410 may indicate three layers (e.g., three indicated SRS resources) for each transmission occasion 415 associated with the first SRS resource set (e.g., may indicate SRS resources 1, 3, and 4). The DCI 410 may indicate two layers (e.g., two indicated SRS resources) for each transmission occasion 420 associated with the second SRS resource set (e.g., may indicate SRS resources 2 and 3). The DCI 410 may further indicate an index value of a set of DMRS ports for the first SRS resource set. For example, the index may be associated with a set of three DMRS ports (e.g., DMRS ports 0, 1, and 6). Accordingly, the UE 115 may map the indicated three DMRS ports to the three layers of each transmission occasion 415. The UE 115 may determine to use a first two DMRS ports of the indicated DMRS ports (e.g., three DMRS ports) for transmission occasions 420 (e.g., transmission occasions having a smaller number of layers).

Accordingly, the UE 115 may map the first two DMRS ports (e.g., DMRS ports 0 and 1) to the two layers of each transmission occasion 420.

The UE 115 may transmit the uplink transmission (e.g., including the sets of transmission occasions) to the base station 105 using the indicated ports, the indicated uplink beams, and based on the SRS resources. The uplink transmission may have improved transmission diversity and quality by transmitting the uplink transmission using different beams to different TRPs 405.

Figure 5:
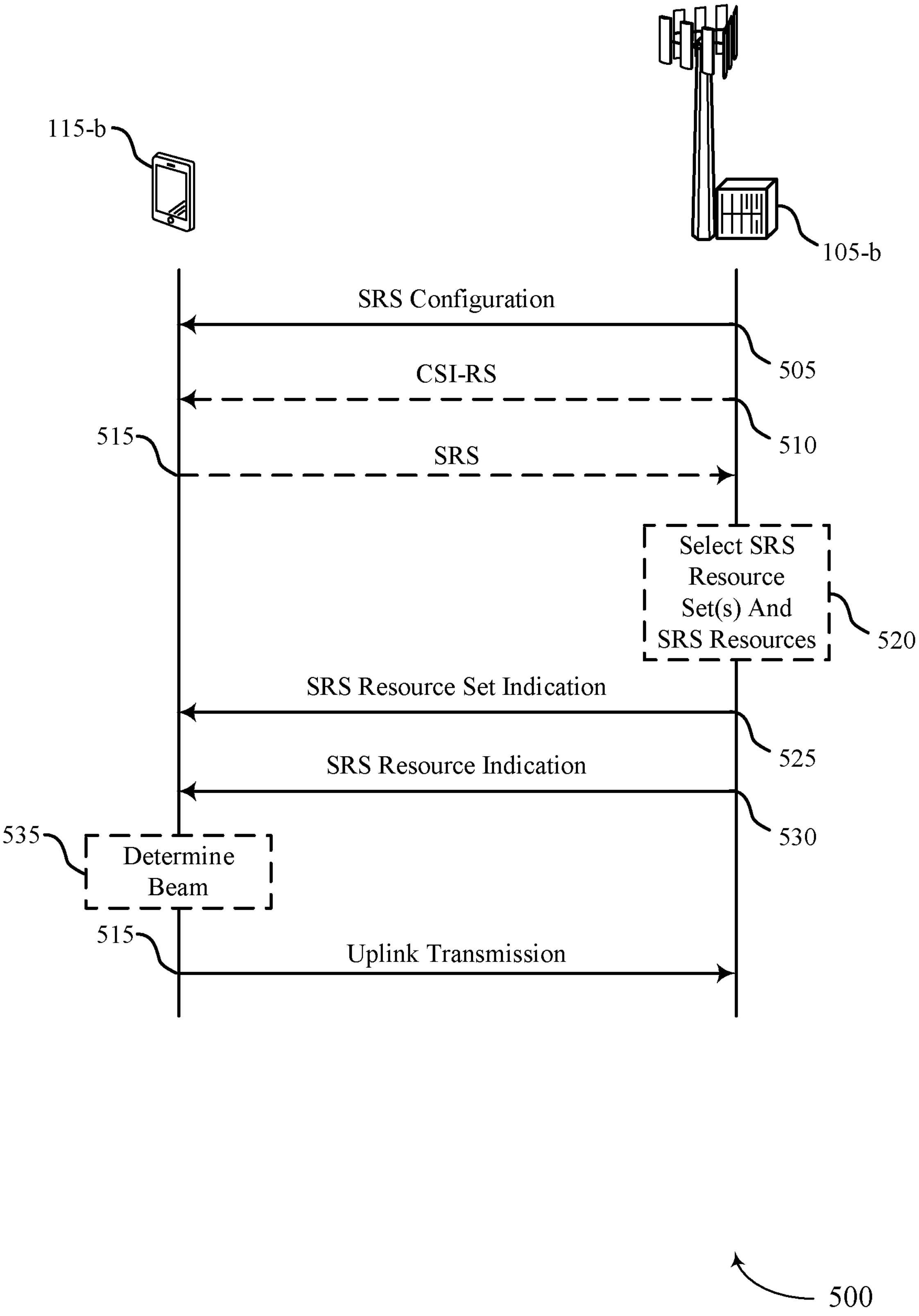
FIG. 5 illustrates an example of a process flow that supports reference signal configurations for uplink beam selection in accordance with aspects of the present disclosure.

FIG. 5 illustrates an example of a process flow 500 that supports reference signal configurations for uplink beam selection in accordance with aspects of the present disclosure. In some examples, process flow 500 may implement or be implemented by aspects of wireless communications system 100 or 200. In some cases, process flow 500 may also implement or be implemented by aspects of reference signal configuration 300 or communications scheme 400. A base station 105-*b* and a UE 115-*b* may implement process flow 500, for example, to configure and transmit an uplink transmission from UE 115-*b* to base station 105-*b*. UE 115-*b* and base station 105-*b* may represent examples of a UE 115 and a base station 105 described with reference to FIGS. 1-4.

In the following description of process flow 500, the operations between UE 115-*b* and base station 105-*b* may be transmitted in a different order than the order shown, or the operations performed by UE 115-*b* and base station 105-*b* may be performed in different orders or at different times. Some operations may also be left out of process flow 500, or other operations may be added to process flow 500. Although UE 115-*b* and base station 105-*b* are shown performing the operations of process flow 500, some aspects of some operations may also be performed by one or more other wireless devices.

At 505, base station 105-*b* may transmit, to UE 115-*b*, an SRS configuration for uplink transmissions. The SRS configuration may include information that indicates multiple SRS resource sets. Additionally or alternatively, in some cases (e.g., for non-codebook based transmissions), the SRS configuration may include multiple downlink reference signal resources (e.g., CSI-RS resources), where each of the SRS resource sets may be associated with a respective downlink reference signal resource of the multiple downlink reference signal resources. As described herein, the downlink reference signal resources may be associated with a spatial domain transmission filter (e.g., uplink beam) that may be used for an uplink transmission.

At 510, in some cases, base station 105-*b* may transmit, to UE 115-*b*, the multiple downlink reference signals (e.g., transmit CSI-RS) using the indicated downlink reference signal resources. UE 115-*b* may receive the downlink reference signals, may measure the downlink reference signals, and may use the measurement of the downlink reference signals to determine a precoder for SRS associated with the multiple SRS resource sets.

At 515, in some cases, UE 115-*b* may transmit, to base station 105-*b*, one or more SRS over the indicated SRS resource sets. In some cases, UE 115-*b* may transmit SRS over an SRS resource set using a precoder based on the downlink reference signal (e.g., CSI-RS) associated with the SRS resource set.

At 520, base station 105-*b* may select one or more SRS resource sets, and one or more SRS resources within the one or more SRS resource sets, based on the transmitted SRS. For example, base station 105-*b* may select an SRS resource set that corresponds to an uplink beam that has a highest signal quality (e.g., highest SNR or best data throughput) at base station 105-*b*. Similarly, base station 105-*b* may select one or more SRS resources in a selected SRS resource set based on a signal quality of the one or more SRS resources.

At 525, base station 105-*b* may transmit, to UE 115-*b*, an indication of the one or more selected SRS resource sets, where the one or more selected SRS resource sets may be included in the multiple SRS resource sets. For example, base station 105-*b* may transmit a DCI (e.g., downlink control message) to UE 115-*b*, where a field of the DCI or a portion of an SRI field of the DCI may indicate the one or more selected SRS resource sets. The DCI may schedule an uplink transmission and may indicate the one or more selected SRS resource sets for the uplink transmission.

At 530, base station 105-*b* may transmit, to UE 115-*b*, an indication of the one or more selected SRS resources, where the one or more selected SRS resource set may be included in the one or more selected SRS resource sets. For example, the DCI including the indication of the one or more selected SRS resource sets may include an SRI field indicating the one or more selected SRS resources, or a portion of the SRI field may indicate the one or more selected SRS resources.

At 535, UE 115-*b* may determine one or more spatial domain transmission filters (e.g., uplink beams) for the uplink transmission based on the one or more indicated SRS resource sets. For example, UE 115-*b* may determine a spatial domain transmission filter to be a same spatial domain transmission filter as a downlink reference signal (e.g., CSI-RS) associated with an indicated SRS resource set, or another spatial domain transmission filter associated with an indicated SRS resource set.

At 540, UE 115-*b* may transmit, to base station 105-*b*, an uplink transmission that is based on the one or more selected SRS resources and the one or more selected SRS resource sets. The uplink transmission may, in some cases, correspond to at least one beam direction corresponding to a downlink reference signal resource (e.g., CSI-RS resource) that is associated with the one or more selected SRS resource sets. In some cases, the uplink transmission may include multiple transmission occasions, where the transmission occasions may include sets of transmission occasions. In some cases, each set of transmission occasions (e.g., corresponding to a TRP or a panel) may be associated with a different uplink beam or beam direction.

Figure 6:
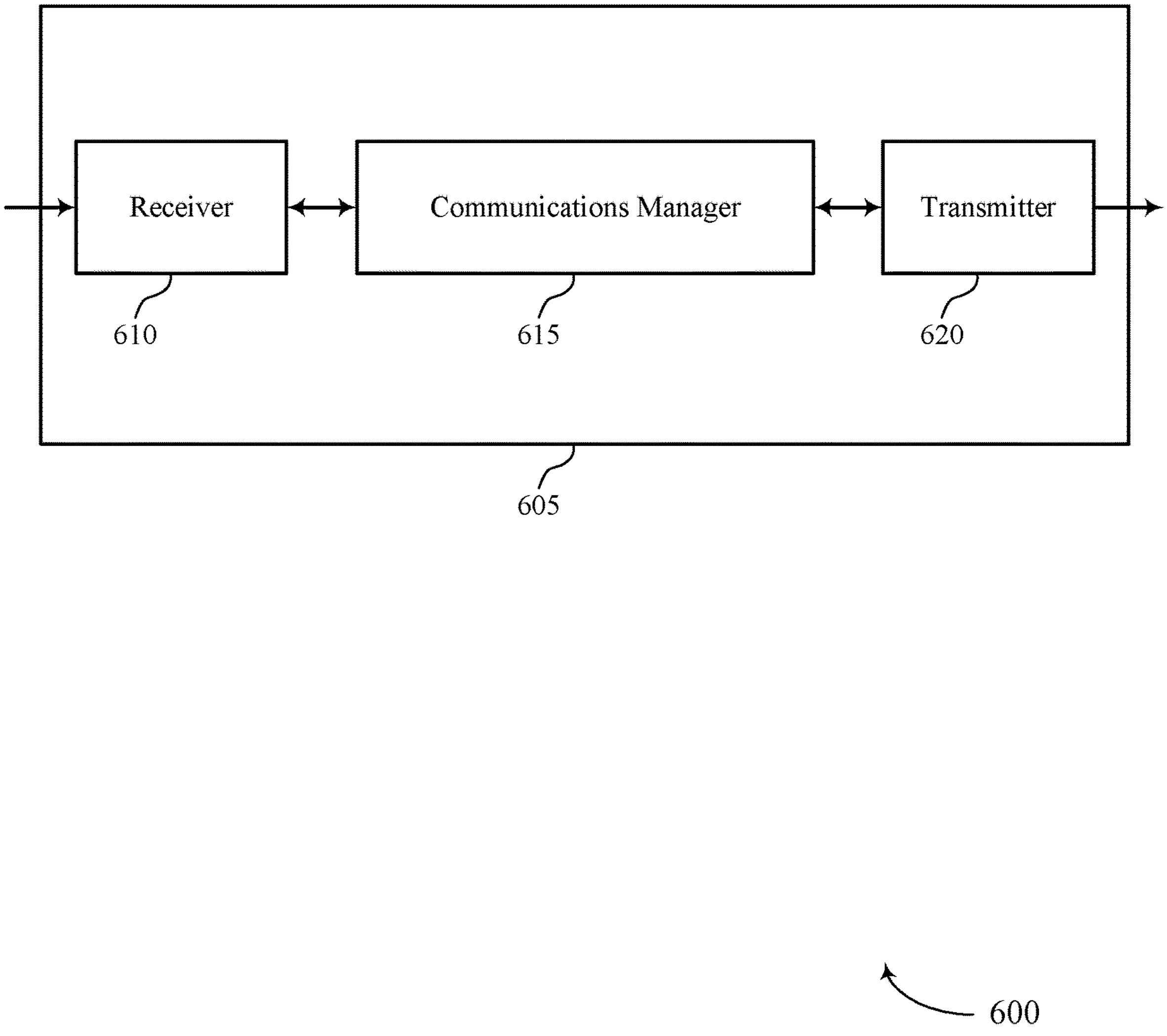
FIGS. 6 and 7 show block diagrams of devices that support reference signal configurations for uplink beam selection in accordance with aspects of the present disclosure.

FIG. 6 shows a block diagram 600 of a device 605 that supports reference signal configurations for uplink beam selection in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to reference signal configurations for uplink beam selection). Information may be passed on to other components of the device 605. The receiver 610 may be an example of aspects of the transceiver 920 described with reference to FIG. 9. The receiver 610 may utilize a single antenna or a set of antennas.

The communications manager 615 may receive information that indicates a set of SRS resource sets, receive an indication of a selected SRS resource set, where the selected SRS resource set is included in the set of SRS resource sets, receive an indication of one or more selected SRS resources, where each selected SRS resource is included in the selected SRS resource set, and transmit an uplink transmission based on the one or more selected SRS resources and via a beam direction associated with the selected SRS resource set. The communications manager 615 may be an example of aspects of the communications manager 910 described herein.

The communications manager 615, or its sub-components, may be implemented in hardware, software (e.g., executed by a processor), or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The actions performed by the communications manager 615, among other examples herein, as described herein may be implemented to realize one or more potential advantages. For example, communications manager 615 may decrease interference and increase throughput at a wireless device (e.g., a UE 115) by supporting selection of an uplink beam for non-codebook based transmissions. The uplink beam may reduce delays, interference, and power consumption (or any combination thereof) compared to other systems and techniques, for example, that do not support selection of an uplink beam for non-codebook based transmissions. Accordingly, communications manager 615 may save power and increase battery life at a wireless device (e.g., a UE 115) by strategically increasing a quality of communications at a wireless device (e.g., a UE 115).

Figure 7:
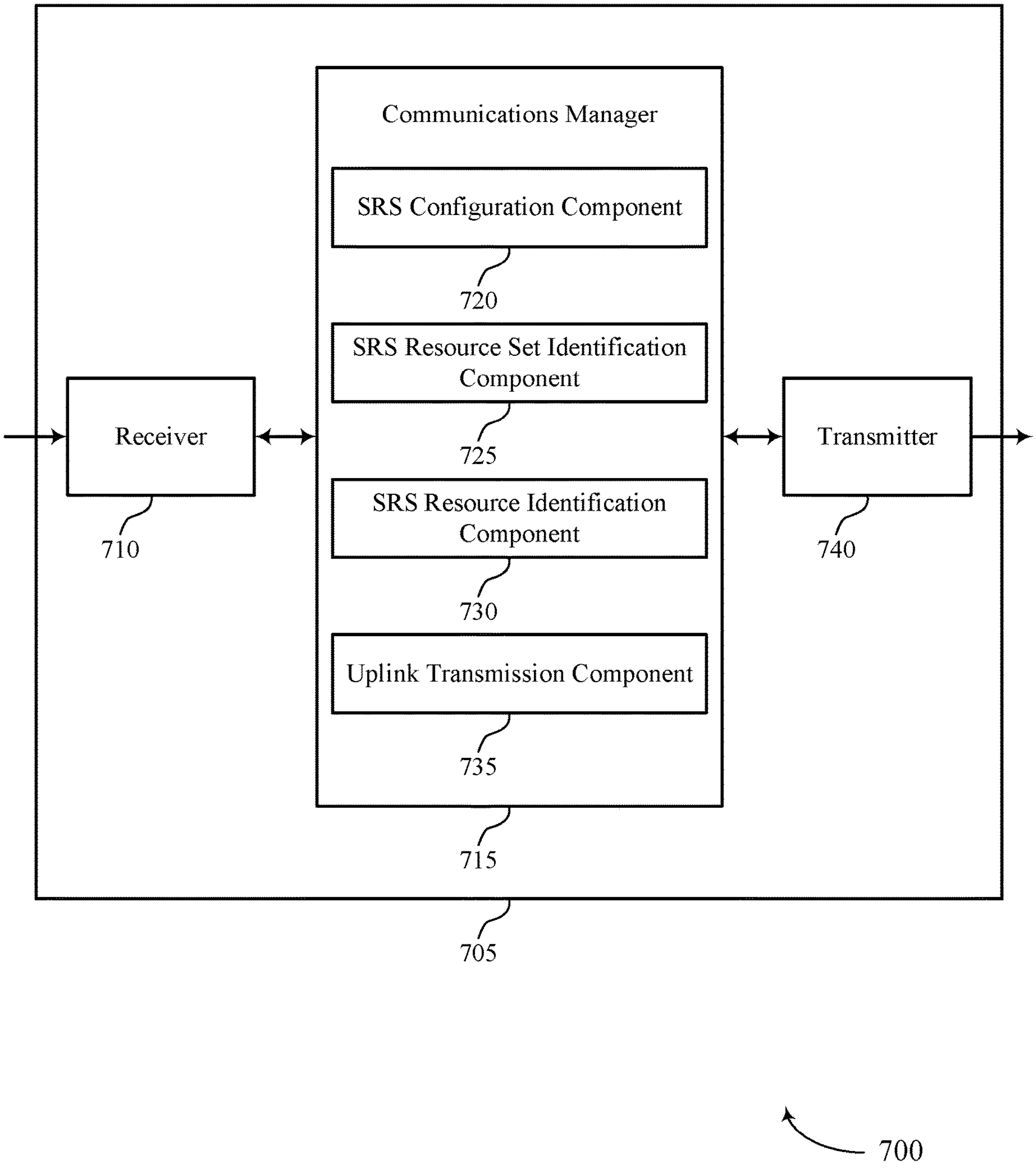

FIG. 7 shows a block diagram 700 of a device 705 that supports reference signal configurations for uplink beam selection in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to reference signal configurations for uplink beam selection). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an SRS configuration component 720, an SRS resource set identification component 725, an SRS resource identification component 730, and an uplink transmission component 735. The communications manager 715 may be an example of aspects of the communications manager 910 described herein.

The SRS configuration component 720 may receive information that indicates a set of SRS resource sets.

The SRS resource set identification component 725 may receive an indication of a selected SRS resource set, where the selected SRS resource set is included in the set of SRS resource sets.

The SRS resource identification component 730 may receive an indication of one or more selected SRS resources, where each selected SRS resource is included in the selected SRS resource set.

The uplink transmission component 735 may transmit an uplink transmission based on the one or more selected SRS resources and via a beam direction associated with the selected SRS resource set.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

A processor of a wireless device (e.g., controlling the receiver 710, the transmitter 740, or the transceiver 920 as described with reference to FIG. 9) may increase communication reliability and accuracy by decreasing interference, and increasing communication quality and available power. The reduced interference may increase communication quality and throughput, which may reduce power consumption (e.g., via implementation of system components described with reference to FIG. 8) compared to other systems and techniques, for example, that do not support selection of an uplink beam for non-codebook based transmissions, which may increase interference and power consumption. Further, the processor of the UE 115 may identify one or more aspects of an SRS configuration or selected SRS resource set to perform the processes described herein. The processor of the wireless device may use the SRS configuration and selected SRS resource set to perform one or more actions that may result in lower interference and power consumption, as well as save power and increase battery life at the wireless device (e.g., by strategically reducing an amount retransmissions), among other benefits.

Figure 8:
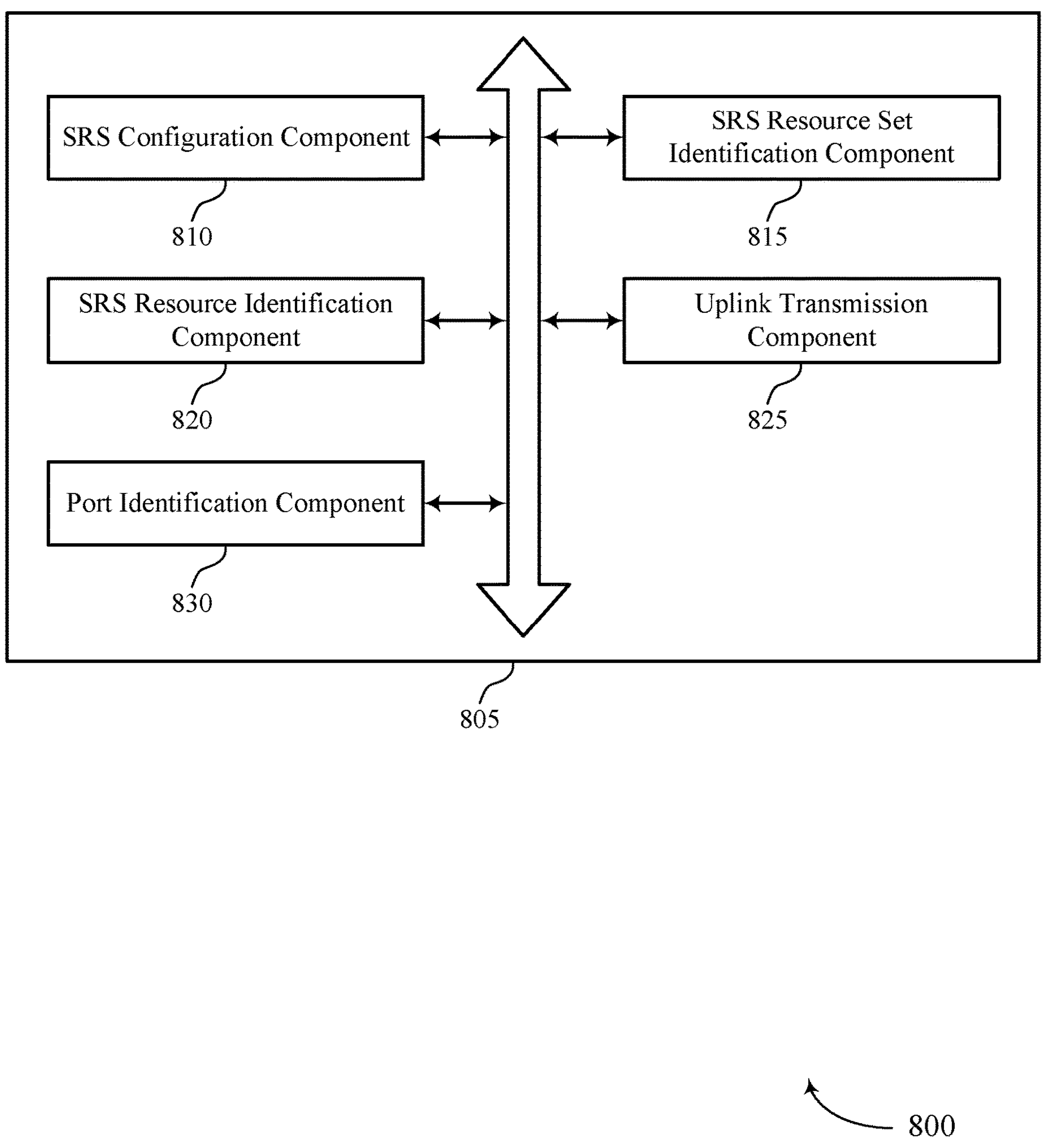
FIG. 8 shows a block diagram of a communications manager that supports reference signal configurations for uplink beam selection in accordance with aspects of the present disclosure.

FIG. 8 shows a block diagram 800 of a communications manager 805 that supports reference signal configurations for uplink beam selection in accordance with aspects of the present disclosure. The communications manager 805 may be an example of aspects of a communications manager 615, a communications manager 715, or a communications manager 910 described herein. The communications manager 805 may include an SRS configuration component 810, an SRS resource set identification component 815, an SRS resource identification component 820, an uplink transmission component 825, and a port identification component

830. Each of these modules may communicate, directly or indirectly, with one another (e.g., via one or more buses).

The SRS configuration component 810 may receive information that indicates a set of SRS resource sets. In some examples, the SRS configuration component 810 may receive information that indicates a set of downlink reference signal resources, where each of the set of SRS resource sets may be associated with a respective downlink reference signal resource of the set of downlink reference signal resources. In some cases, the set of downlink reference signal resources includes a set of CSI-RS resources.

The SRS resource set identification component 815 may receive an indication of a selected SRS resource set, where the selected SRS resource set is included in the set of SRS resource sets. In some examples, the SRS resource set identification component 815 may receive a DCI message, where a first field of the DCI message includes the indication of the selected SRS resource set, and where a second field of the DCI message includes the indication of the one or more selected SRS resources. In some examples, the SRS resource set identification component 815 may determine a quantity of selected SRS resource sets based on a value of the first field.

In some examples, the SRS resource set identification component 815 may receive a DCI message, where a first set of bits within a field of the DCI message includes the indication of the selected SRS resource set, and where a second set of bits within the field of the DCI message includes the indication of the one or more selected SRS resources. In some examples, the SRS resource set identification component 815 may receive a DCI message including a grant for the uplink transmission, where the uplink transmission is transmitted based on the grant.

In some examples, the SRS resource set identification component 815 may receive an indication of a second selected SRS resource set, where the second selected SRS resource set is included in the set of SRS resource sets. In some cases, the first set of bits are more significant than a second set of bits. In some cases, each of the set of downlink reference signal resource sets corresponds to a respective beam direction.

In some cases, the indication of the selected SRS resource set, the indication of the one or more selected SRS resources, the indication of the second selected SRS resource set, and the indication of the one or more second selected SRS resources are received within a grant for an uplink transmission. In some cases, the grant for the uplink transmission schedules multiple occasions of the uplink transmission. In some cases, the indication of the selected SRS resource set, the indication of the one or more selected SRS resources, the indication of the second selected SRS resource set, and the indication of the one or more second selected SRS resources are received within a DCI message.

In some cases, the indication of the selected SRS resource set, the indication of the one or more selected SRS resources, the indication of the second selected SRS resource set, and the indication of the one or more second selected SRS resources are received within a DCI message. In some cases, a first field of the DCI message indicates the selected SRS resource set and the second selected SRS resource set.

In some cases, the indication of a selected SRS resource set, the indication of the one or more selected SRS resources, the indication of the second selected SRS resource set, and the indication of the one or more second selected SRS resources are received within a field of a DCI message. In some cases, a first set of bits within the field indicates the selected SRS resource set and the second selected SRS resource set.

The SRS resource identification component 820 may receive an indication of one or more selected SRS resources, where each selected SRS resource is included in the selected SRS resource set. In some examples, the SRS resource identification component 820 may ignore one or more additional fields of the DCI message that are associated with selected SRS resources based on determining the quantity of selected SRS resource sets.

In some examples, the SRS resource identification component 820 may receive an indication of one or more second selected SRS resources, where each second selected SRS resource is included in the second selected SRS resource set. In some cases, each of the set of SRS resource sets includes a respective quantity of SRS resources. In some cases, a quantity of bits included in the indication of the one or more selected SRS resources is based on a largest respective quantity of SRS resources. In some cases, the one or more selected SRS resources correspond to one or more respective transmission layers. In some cases, a second field of the DCI message indicates the one or more selected SRS resources. In some cases, a third field of the DCI message indicates the one or more second selected SRS resources.

In some cases, a second set of bits within the field indicates the one or more selected SRS resources and the one or more second selected SRS resources. In some cases, the one or more selected SRS resources and the one or more second selected SRS resources each include a same quantity of reference signal resources.

The uplink transmission component 825 may transmit an uplink transmission based on the one or more selected SRS resources and via a beam direction associated with the selected SRS resource set. In some examples, the uplink transmission component 825 may transmit one or more SRSs over each of the set of SRS sets, where receiving the indication of the selected SRS resource set and the indication of the one or more selected SRS resources is based on transmitting the one or more SRSs.

In some examples, the uplink transmission component 825 may receive the respective downlink reference signal resource using a spatial domain transmission filter, where transmitting the uplink transmission via the beam direction corresponding to the respective downlink reference signal resource includes transmitting the uplink transmission using the spatial domain transmission filter. In some examples, the uplink transmission component 825 may transmit the uplink transmission based on the one or more selected SRS resources includes transmitting the uplink transmission via the one or more respective transmission layers.

In some examples, the uplink transmission component 825 may transmit the uplink transmission based on the one or more second selected SRS resources and via a second beam direction associated with the second selected SRS resource set. In some cases, the second beam direction may correspond to a second respective downlink reference signal resource, of the plurality of downlink reference signal resources, that is associated with the second selected SRS resource set. In some cases, a first set of one or more occasions of the uplink transmission are transmitted via the beam direction and based on the one or more selected SRS resources. In some cases, a second set of one or more occasions of the uplink transmission are transmitted via the second beam direction and based on the one or more second selected SRS resources.

In some cases, an occasion of the uplink transmission included in the second set is transmitted after a first occasion of the uplink transmission included in the first set and before a second occasion of the uplink transmission included in the first set. In some cases, the uplink transmission is transmitted via the beam direction and via the second beam direction within a same transmission time interval. In some cases, the beam direction is associated with a first transmission and reception point or a first panel. In some cases, the second beam direction is associated with a second transmission and reception point or a second panel. In some cases, the uplink transmission includes a physical uplink shared channel (PUSCH) transmission.

In some examples, the uplink transmission component 825 may transmit the uplink transmission via a beam direction corresponding to a respective downlink reference signal resource, of the set of downlink reference signal resources, that is associated with the selected SRS resource set.

The port identification component 830 may identify, within a field of the DCI message, an indication of a set of antenna ports. In some examples, the port identification component 830 may associate the set of antenna ports with the one or more selected SRS resources, where the uplink transmission in the first set of one or more occasions is transmitted based on the set of antenna ports. In some examples, the port identification component 830 may associate a subset of the set of antenna ports with the one or more second selected SRS resources, where the uplink transmission in the second set of one or more occasions is transmitted based on the subset of the set of antenna ports. In some cases, the one or more selected SRS resources includes a first quantity of reference signal resources and the one or more second selected SRS resources includes a second quantity of reference signal resources that is smaller than the first quantity.

Figure 9:
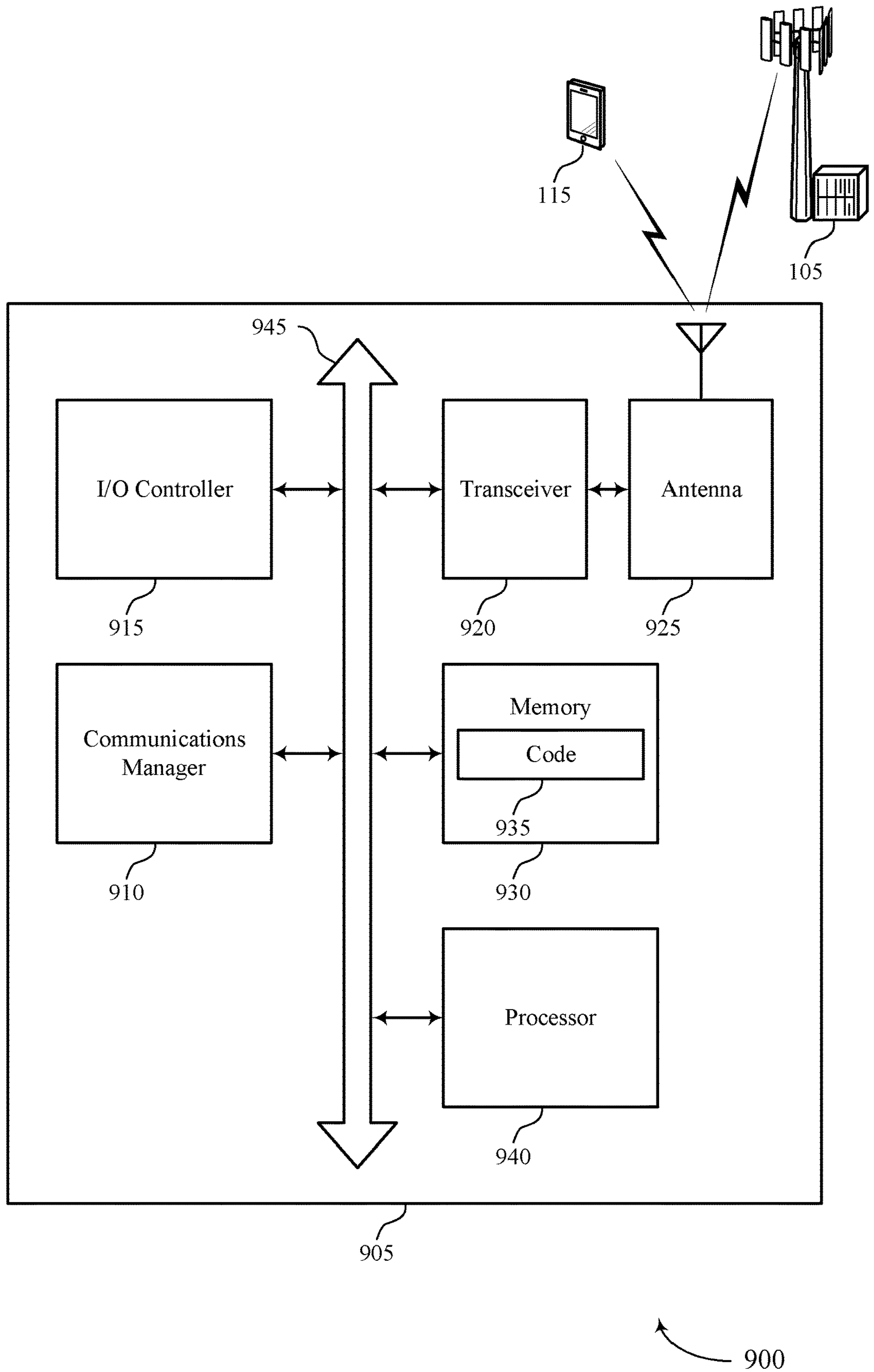
FIG. 9 shows a diagram of a system including a device that supports reference signal configurations for uplink beam selection in accordance with aspects of the present disclosure.

FIG. 9 shows a diagram of a system 900 including a device 905 that supports reference signal configurations for uplink beam selection in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive information that indicates a set of SRS resource sets, receive an indication of a selected SRS resource set, where the selected SRS resource set is included in the set of SRS resource sets, receive an indication of one or more selected SRS resources, where each selected SRS resource is included in the selected SRS resource set, and transmit an uplink transmission based on the one or more selected SRS resources and via a beam direction associated with the selected SRS resource set.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting reference signal configurations for uplink beam selection).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled/converted/interpreted and executed) to perform functions described herein.

Figure 10:
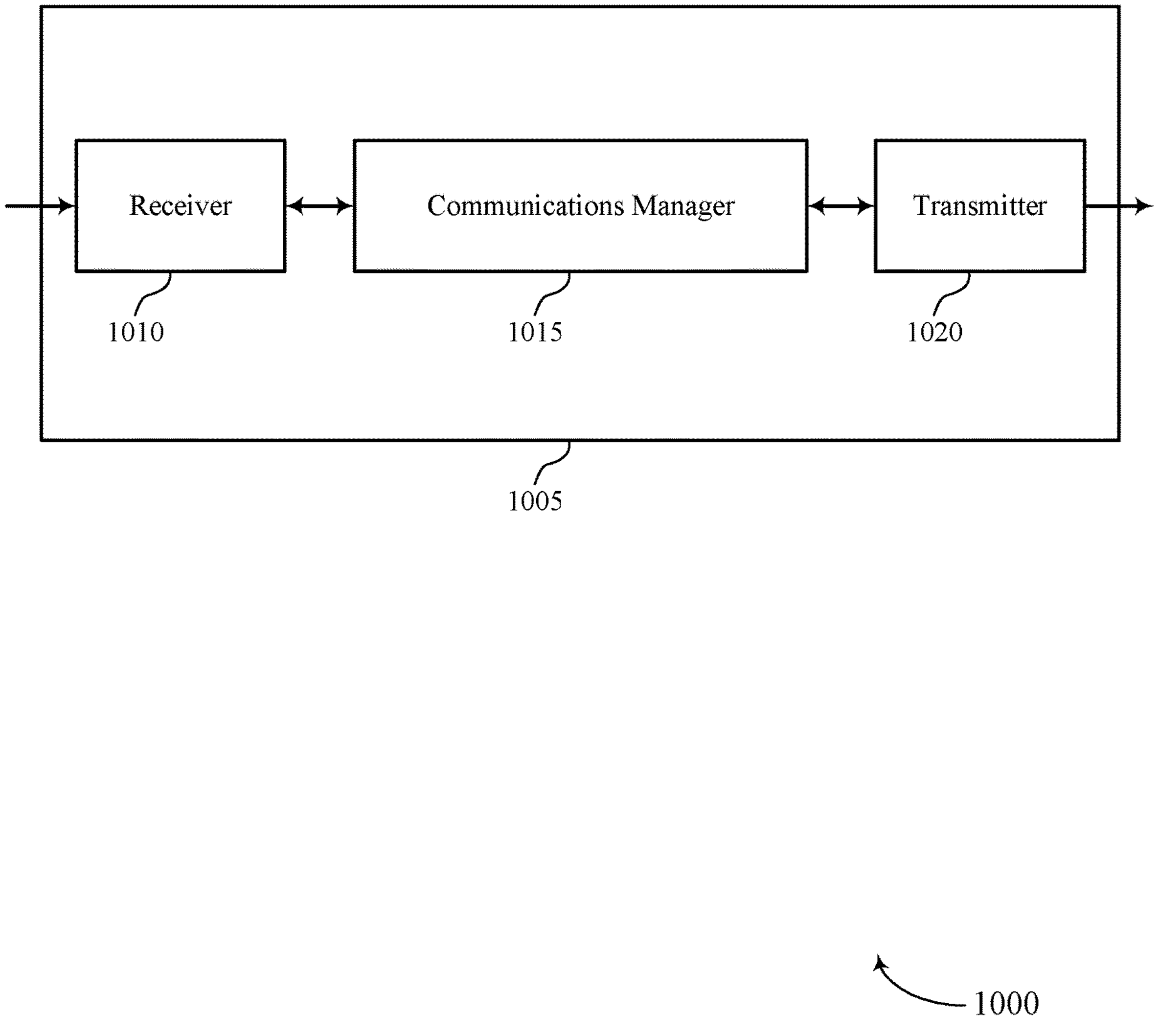
FIGS. 10 and 11 show block diagrams of devices that support reference signal configurations for uplink beam selection in accordance with aspects of the present disclosure.

FIG. 10 shows a block diagram 1000 of a device 1005 that supports reference signal configurations for uplink beam selection in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal configurations for uplink beam selection). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit information that indicates a set of SRS resource sets, transmit an indication of a selected SRS resource set, where the selected SRS resource set is included in the set of SRS resource sets, transmit an indication of one or more selected SRS resources, where each selected SRS resource is included in the selected SRS resource set, and receive an uplink transmission based on the one or more selected SRS resources and via a beam direction associated with the selected SRS resource set. The communications manager 1015 may be an example of aspects of the communications manager 1310 described herein.

The communications manager 1015, or its sub-components, may be implemented in hardware, software (e.g., executed by a processor), or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
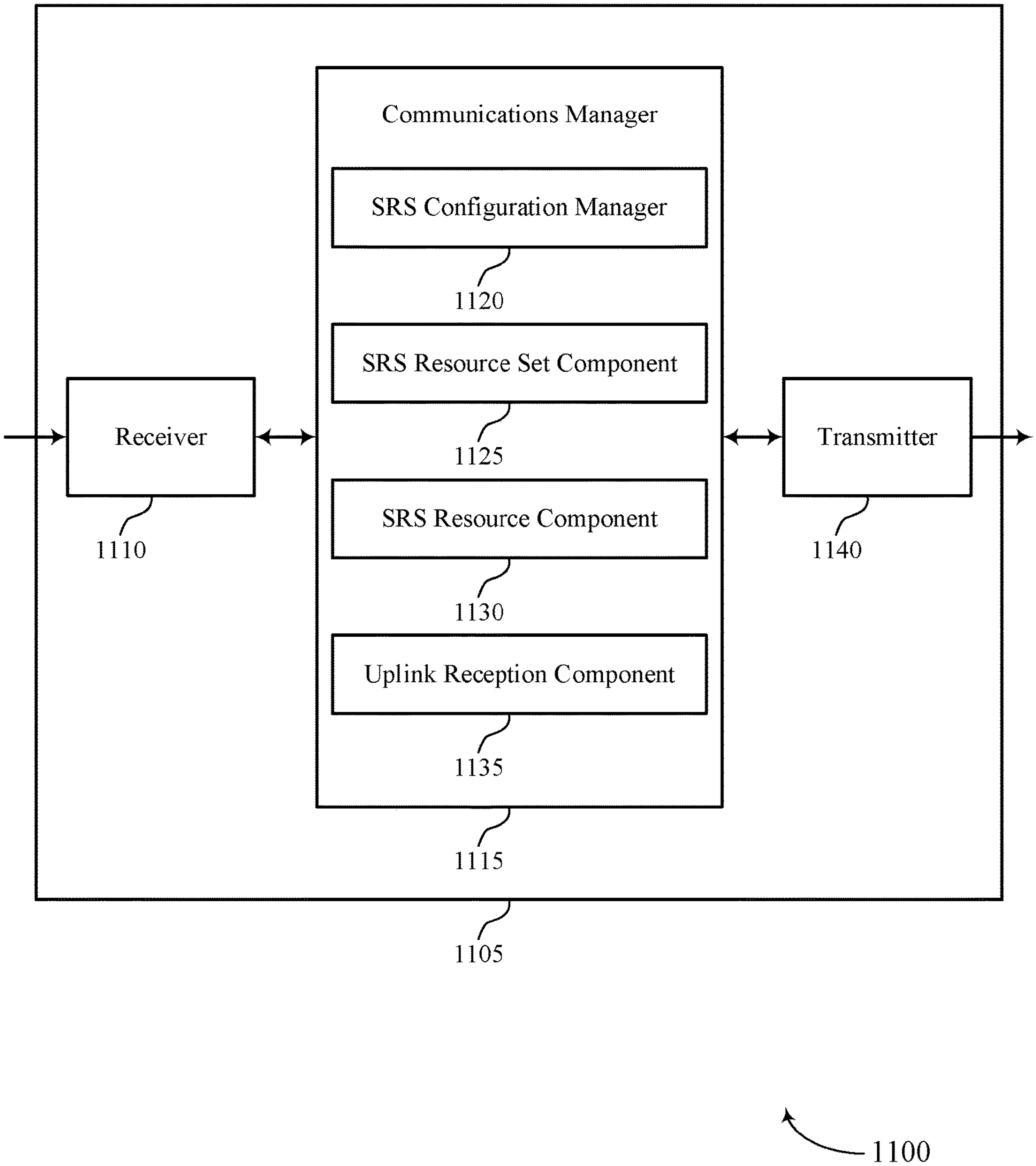

FIG. 11 shows a block diagram 1100 of a device 1105 that supports reference signal configurations for uplink beam selection in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to reference signal configurations for uplink beam selection). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an SRS configuration manager 1120, an SRS resource set component 1125, an SRS resource component 1130, and an uplink reception component 1135. The communications manager 1115 may be an example of aspects of the communications manager 1310 described herein.

The SRS configuration manager 1120 may transmit information that indicates a set of SRS resource sets.

The SRS resource set component 1125 may transmit an indication of a selected SRS resource set, where the selected SRS resource set is included in the set of SRS resource sets.

The SRS resource component 1130 may transmit an indication of one or more selected SRS resources, where each selected SRS resource is included in the selected SRS resource set.

The uplink reception component 1135 may receive an uplink transmission based on the one or more selected SRS resources and via a beam direction associated with the selected SRS resource set.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
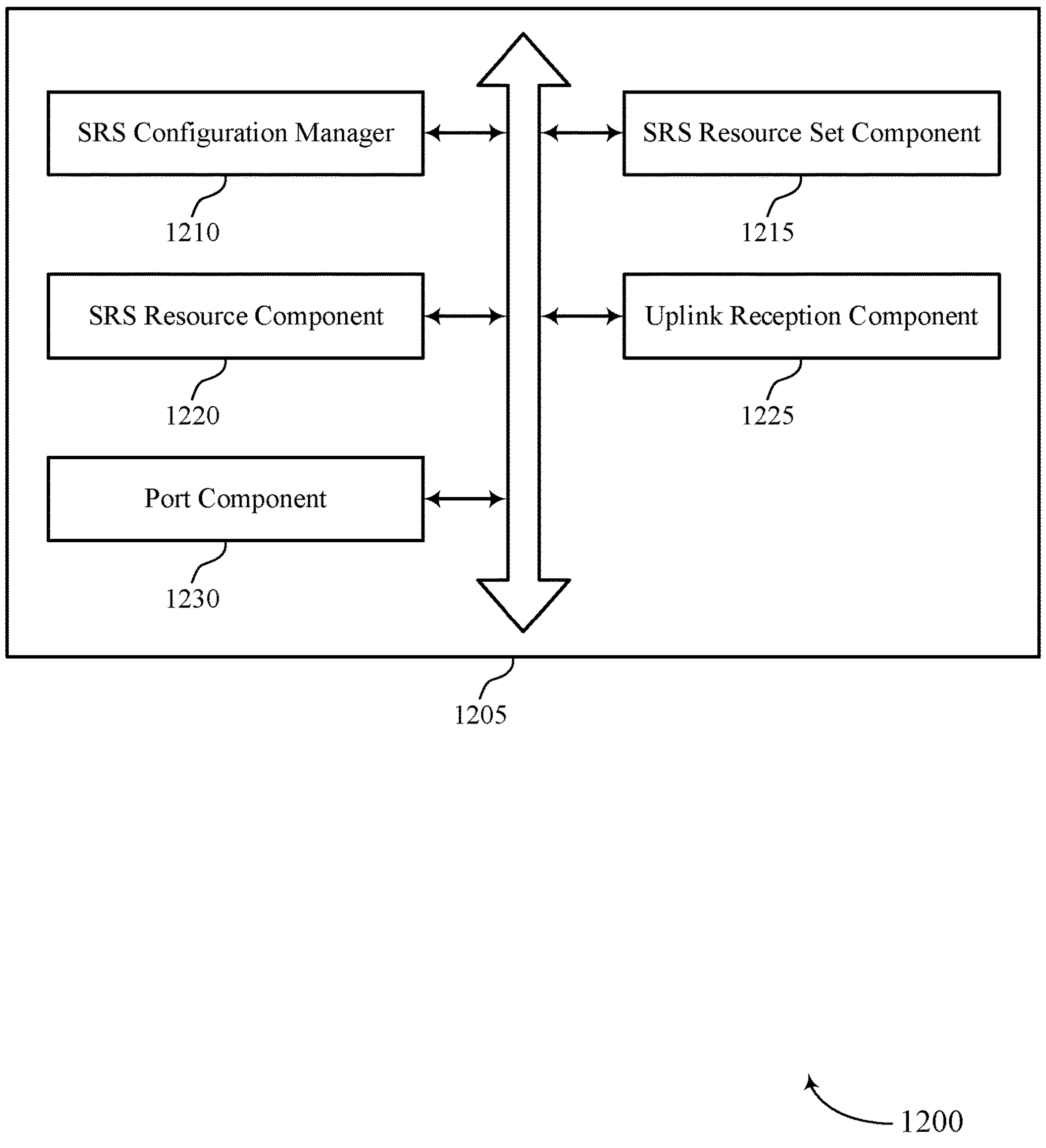
FIG. 12 shows a block diagram of a communications manager that supports reference signal configurations for uplink beam selection in accordance with aspects of the present disclosure.

FIG. 12 shows a block diagram 1200 of a communications manager 1205 that supports reference signal configurations for uplink beam selection in accordance with aspects of the present disclosure. The communications manager 1205 may be an example of aspects of a communications manager 1015, a communications manager 1115, or a communications manager 1310 described herein. The communications manager 1205 may include an SRS configuration manager 1210, an SRS resource set component 1215, an SRS resource component 1220, an uplink reception component 1225, and a port component 1230. Each of these modules may communicate, directly or indirectly, with one another (e.g., via one or more buses).

The SRS configuration manager 1210 may transmit information that indicates a set of SRS resource sets. In some examples, the SRS configuration manager 1210 may transmit information that indicates a set of downlink reference signal resources, where each of the set of SRS resource sets may be associated with a respective downlink reference signal resource of the set of downlink reference signal resources. In some cases, the set of downlink reference signal resources includes a set of CSI-RS resources.

The SRS resource set component 1215 may transmit an indication of a selected SRS resource set, where the selected SRS resource set is included in the set of SRS resource sets. In some examples, the SRS resource set component 1215 may determine the selected SRS resource set and the one or more selected SRS resources based on the one or more SRSs. In some examples, the SRS resource set component 1215 may transmit a DCI message, where a first field of the DCI message includes the indication of the selected SRS resource set, and where a second field of the DCI message includes the indication of the one or more selected SRS resources.

In some examples, the SRS resource set component 1215 may determine a quantity of selected SRS resource sets. In some examples, the SRS resource set component 1215 may pad one or more additional fields of the DCI message that are associated with selected SRS resources based on determining the quantity of selected SRS resource sets. In some examples, the SRS resource set component 1215 may transmit a DCI message, where a first set of bits within a field of the DCI message includes the indication of the selected SRS resource set, and where a second set of bits within the field of the DCI message includes the indication of the one or more selected SRS resources.

In some examples, the SRS resource set component 1215 may transmit a DCI message including a grant for an uplink transmission, where the uplink transmission is transmitted based on the grant. In some examples, the SRS resource set component 1215 may transmit an indication of a second selected SRS resource set, where the second selected SRS resource set is included in the set of SRS resource sets. In some cases, the first set of bits are more significant than the second set of bits. In some cases, each of the set of downlink reference signal resource sets corresponds to a respective beam direction.

In some cases, the indication of the selected SRS resource set, the indication of the one or more selected SRS resources, the indication of the second selected SRS resource set, and the indication of the one or more second selected SRS resources are transmitted within a grant for the uplink transmission. In some cases, the grant for the uplink transmission schedules multiple occasions of the uplink transmission.

In some cases, the indication of the selected SRS resource set, the indication of the one or more selected SRS resources, the indication of the second selected SRS resource set, and the indication of the one or more second selected SRS resources are transmitted within a DCI message. In some cases, a first field of the DCI message indicates the selected SRS resource set and the second selected SRS resource set.

In some cases, the indication of a selected SRS resource set, the indication of the one or more selected SRS resources, the indication of the second selected SRS resource set, and the indication of the one or more second selected SRS resources are transmitted within a field of a DCI message. In some cases, a first set of bits within the field indicates the selected SRS resource set and the second selected SRS resource set.

The SRS resource component 1220 may transmit an indication of one or more selected SRS resources, where each selected SRS resource is included in the selected SRS resource set. In some examples, receiving the uplink transmission based on the one or more selected SRS resources includes receiving the uplink transmission via the one or more respective transmission layers. In some examples, the SRS resource component 1220 may transmit an indication of one or more second selected SRS resources, where each second selected SRS resource is included in the second selected SRS resource set.

In some cases, each of the set of SRS resource sets includes a respective quantity of SRS resources. In some cases, a quantity of bits included in the indication of the one or more selected SRS resources is based on a largest respective quantity of SRS resources. In some cases, the one or more selected SRS resources correspond to one or more respective transmission layers. In some cases, a second field of the DCI message indicates the one or more selected SRS resources. In some cases, a third field of the DCI message indicates the one or more second selected SRS resources.

In some cases, a second set of bits within the field indicates the one or more selected SRS resources and the one or more second selected SRS resources. In some cases, the one or more selected SRS resources and the one or more second selected SRS resources each include a same quantity of reference signal resources.

The uplink reception component 1225 may receive an uplink transmission based on the one or more selected SRS resources and via a beam direction associated with the selected SRS resource set. In some examples, the uplink reception component 1225 may receive one or more SRSs over each of the set of SRS sets. In some examples, transmitting the respective downlink reference signal resource using a spatial domain transmission filter, where receiving the uplink transmission via the beam direction corresponding to the respective downlink reference signal resource includes receiving the uplink transmission using the spatial domain transmission filter. In some examples, the uplink reception component 1225 may transmit the uplink transmission via a beam direction corresponding to a respective downlink reference signal resource, of the set of downlink reference signal resources, that is associated with the selected SRS resource set.

In some examples, the uplink reception component 1225 may receive the uplink transmission based on the one or more second selected SRS resources and via a second beam direction associated with the second selected SRS resource set. In some cases, the second beam direction may correspond to a second respective downlink reference signal resource, of the plurality of downlink reference signal resources, that is associated with the second selected SRS resource set. In some cases, a first set of one or more occasions of the uplink transmission are received via the beam direction and based on the one or more selected SRS resources.

In some cases, a second set of one or more occasions of the uplink transmission are received via the second beam direction and based on the one or more second selected SRS resources. In some cases, an occasion of the uplink transmission included in the second set is received after a first occasion of the uplink transmission included in the first set and before a second occasion of the uplink transmission included in the first set. In some cases, the uplink transmission is received via the beam direction and via the second beam direction within a same transmission time interval. In some cases, the beam direction is associated with a first transmission and reception point or a first panel. In some cases, the second beam direction is associated with a second transmission and reception point or a second panel. In some cases, the uplink transmission includes a PUSCH transmission.

The port component 1230 may include, within a field of the DCI message, an indication of a set of antenna ports, where the uplink transmission in the first set of one or more occasions is based on the set of antenna ports, and where the uplink transmission in the second set of one or more occasions is based on the subset of the set of antenna ports. In some cases, the one or more selected SRS resources includes a first quantity of reference signal resources and the one or more second selected SRS resources includes a second quantity of reference signal resources that is smaller than the first quantity. In some cases, the indication of the selected SRS resource set, the indication of the one or more selected SRS resources, the indication of the second selected SRS resource set, and the indication of the one or more second selected SRS resources are received within a DCI message.

Figure 13:
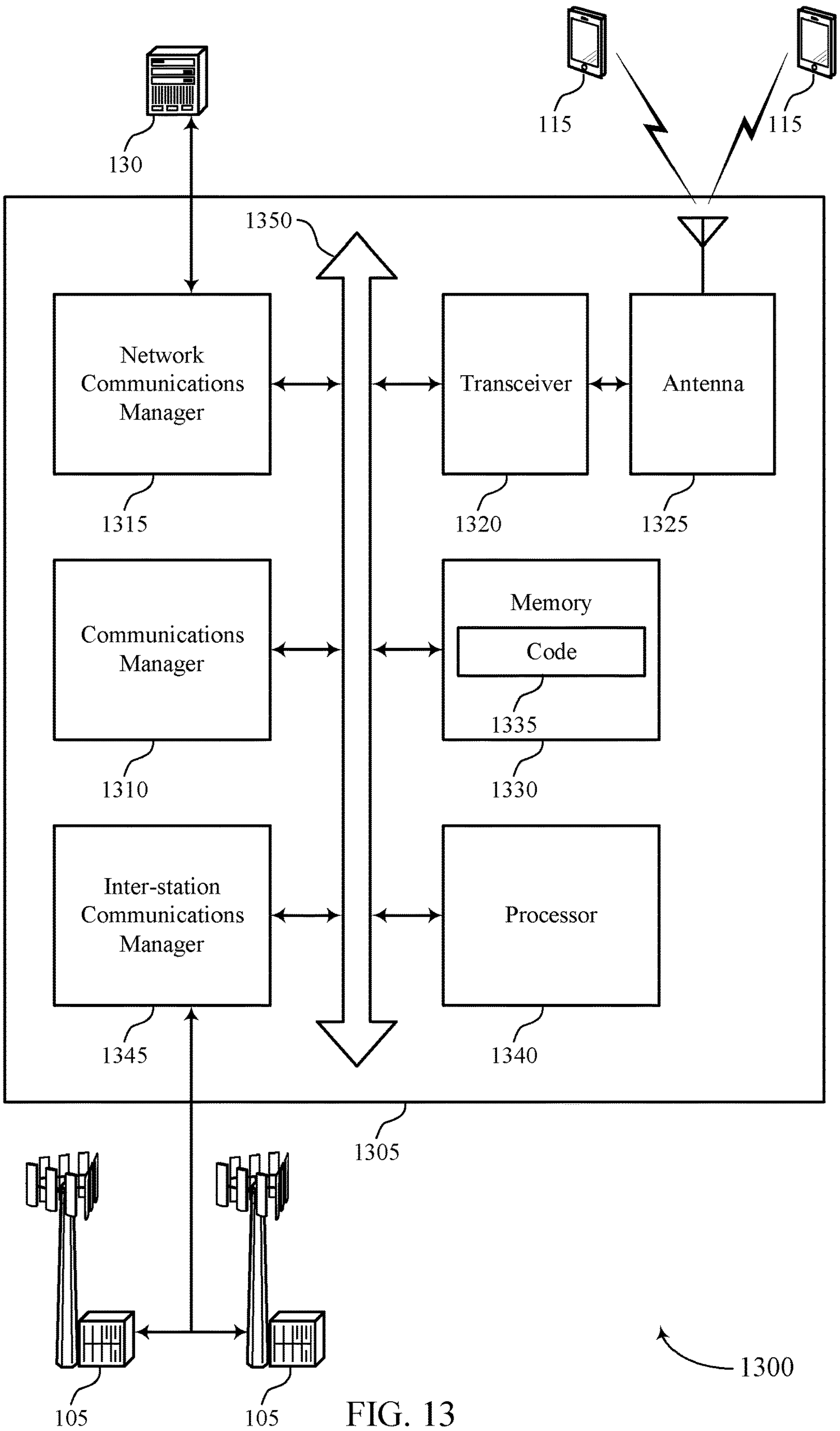
FIG. 13 shows a diagram of a system including a device that supports reference signal configurations for uplink beam selection in accordance with aspects of the present disclosure.

FIG. 13 shows a diagram of a system 1300 including a device 1305 that supports reference signal configurations for uplink beam selection in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit information that indicates a set of SRS resource sets, transmit an indication of a selected SRS resource set, where the selected SRS resource set is included in the set of SRS resource sets, transmit an indication of one or more selected SRS resources, where each selected SRS resource is included in the selected SRS resource set, and receive an uplink transmission based on the one or more selected SRS resources and via a beam direction associated with the selected SRS resource set.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting reference signal configurations for uplink beam selection).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled/converted/interpreted and executed) to perform functions described herein.

Figure 14:
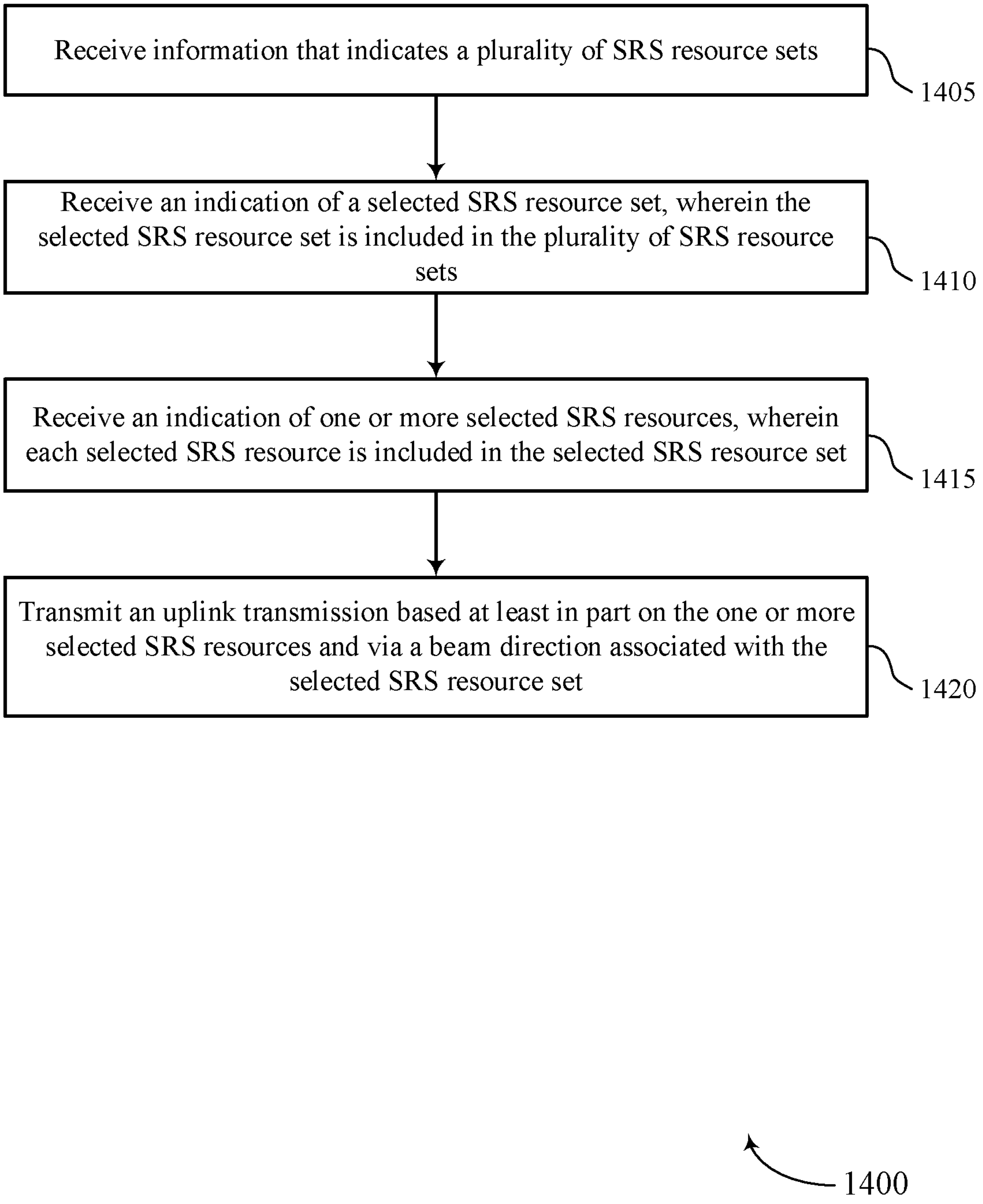
FIGS. 14 through 17 show flowcharts illustrating methods that support reference signal configurations for uplink beam selection in accordance with aspects of the present disclosure.

FIG. 14 shows a flowchart illustrating a method 1400 that supports reference signal configurations for uplink beam selection in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive information that indicates a plurality of SRS resource sets. The operations of 1405 may be performed according to the methods described herein. In some examples, aspects of the operations of 1405 may be performed by an SRS configuration component as described with reference to FIGS. 6 through 9.

At 1410, the UE may receive an indication of a selected SRS resource set, wherein the selected SRS resource set is included in the plurality of SRS resource sets. The operations of 1410 may be performed according to the methods described herein. In some examples, aspects of the operations of 1410 may be performed by an SRS resource set identification component as described with reference to FIGS. 6 through 9.

At 1415, the UE may receive an indication of one or more selected SRS resources, wherein each selected SRS resource is included in the selected SRS resource set. The operations of 1415 may be performed according to the methods described herein. In some examples, aspects of the operations of 1415 may be performed by an SRS resource identification component as described with reference to FIGS. 6 through 9.

At 1420, the UE may transmit an uplink transmission based at least in part on the one or more selected SRS resources and via a beam direction associated with the selected SRS resource set. The operations of 1420 may be performed according to the methods described herein. In some examples, aspects of the operations of 1420 may be performed by an uplink transmission component as described with reference to FIGS. 6 through 9.

Figure 15:
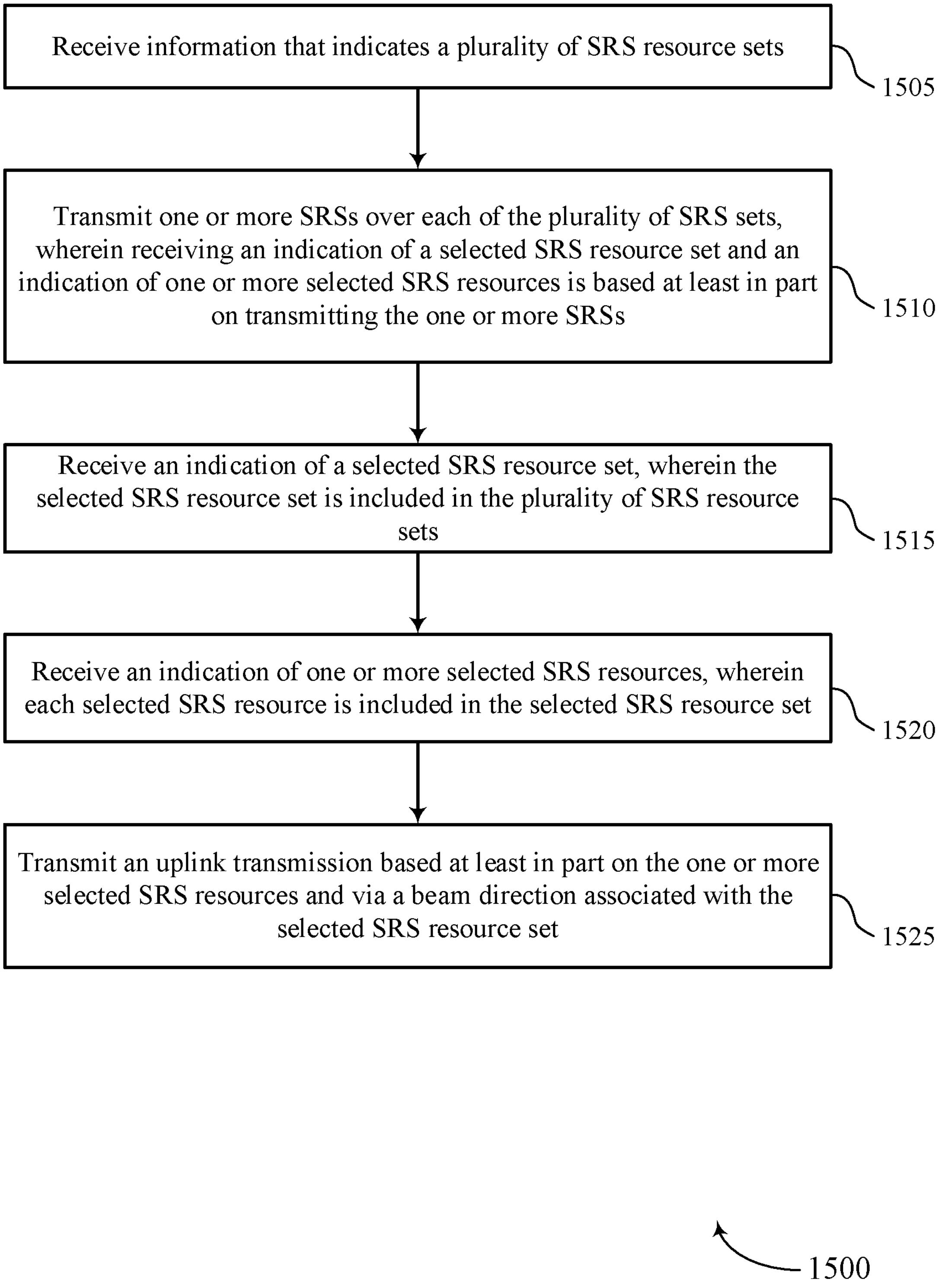

FIG. 15 shows a flowchart illustrating a method 1500 that supports reference signal configurations for uplink beam selection in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive information that indicates a plurality of SRS resource sets. The operations of 1505 may be performed according to the methods described herein. In some examples, aspects of the operations of 1505 may be performed by an SRS configuration component as described with reference to FIGS. 6 through 9.

At 1510, the UE may transmit one or more SRSs over each of the plurality of SRS sets, wherein receiving an indication of the selected SRS resource set and an indication of the one or more selected SRS resources is based at least in part on transmitting the one or more SRSs. The operations of 1510 may be performed according to the methods described herein. In some examples, aspects of the operations of 1510 may be performed by an uplink transmission component as described with reference to FIGS. 6 through 9.

At 1515, the UE may receive an indication of a selected SRS resource set, wherein the selected SRS resource set is included in the plurality of SRS resource sets. The operations of 1515 may be performed according to the methods described herein. In some examples, aspects of the operations of 1515 may be performed by an SRS resource set identification component as described with reference to FIGS. 6 through 9.

At 1520, the UE may receive an indication of one or more selected SRS resources, wherein each selected SRS resource is included in the selected SRS resource set. The operations of 1520 may be performed according to the methods described herein. In some examples, aspects of the operations of 1520 may be performed by an SRS resource identification component as described with reference to FIGS. 6 through 9.

At 1525, the UE may transmit an uplink transmission based at least in part on the one or more selected SRS resources and via a beam direction associated with the selected SRS resource set. The operations of 1525 may be performed according to the methods described herein. In some examples, aspects of the operations of 1525 may be performed by an uplink transmission component as described with reference to FIGS. 6 through 9.

Figure 16:
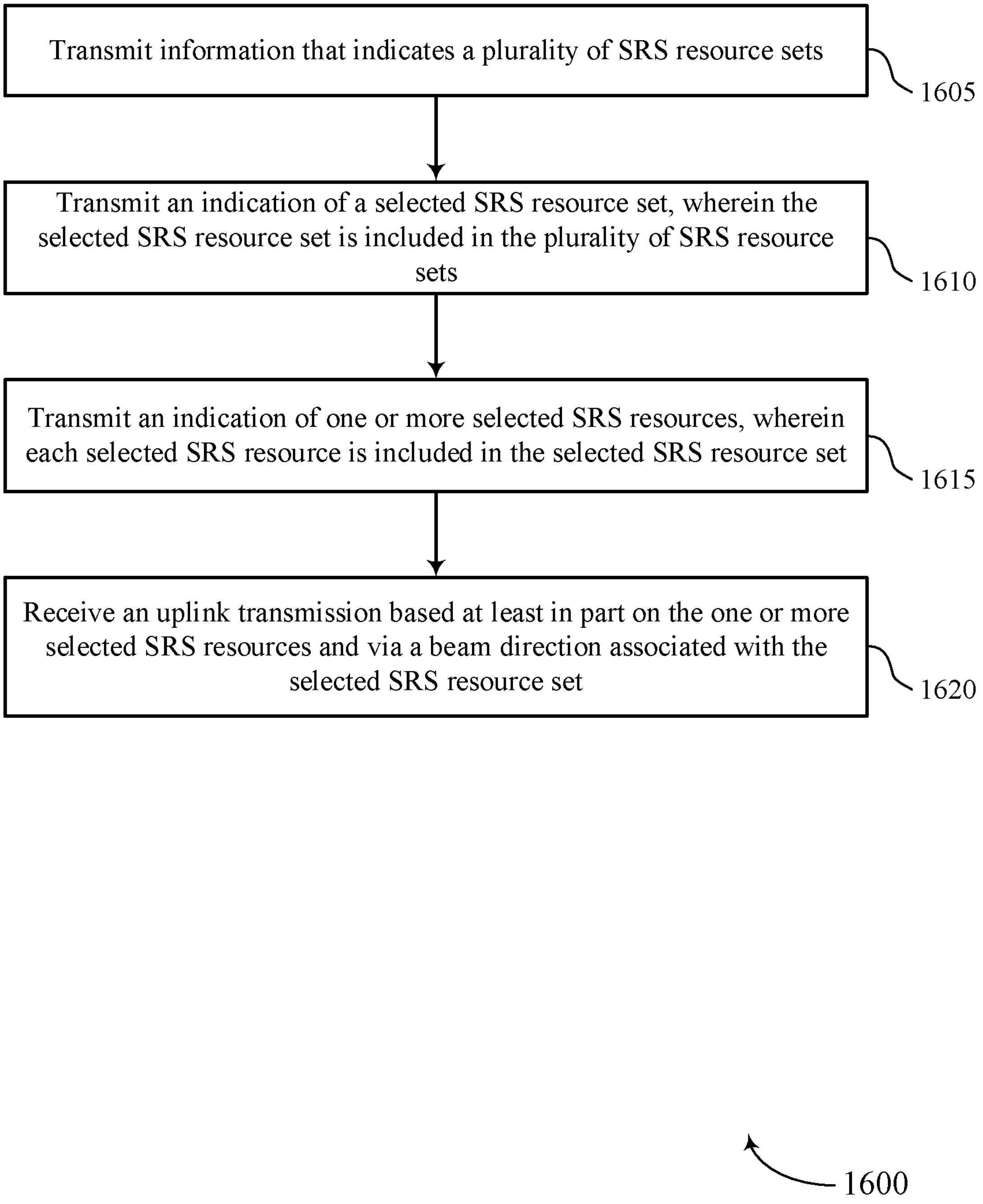

FIG. 16 shows a flowchart illustrating a method 1600 that supports reference signal configurations for uplink beam selection in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit information that indicates a plurality of SRS resource sets. The operations of 1605 may be performed according to the methods described herein. In some examples, aspects of the operations of 1605 may be performed by an SRS configuration manager as described with reference to FIGS. 10 through 13.

At 1610, the base station may transmit an indication of a selected SRS resource set, wherein the selected SRS resource set is included in the plurality of SRS resource sets. The operations of 1610 may be performed according to the methods described herein. In some examples, aspects of the operations of 1610 may be performed by an SRS resource set component as described with reference to FIGS. 10 through 13.

At 1615, the base station may transmit an indication of one or more selected SRS resources, wherein each selected SRS resource is included in the selected SRS resource set. The operations of 1615 may be performed according to the methods described herein. In some examples, aspects of the operations of 1615 may be performed by an SRS resource component as described with reference to FIGS. 10 through 13.

At 1620, the base station may receive an uplink transmission based at least in part on the one or more selected SRS resources and via a beam direction associated with the selected SRS resource set. The operations of 1620 may be performed according to the methods described herein. In some examples, aspects of the operations of 1620 may be performed by an uplink reception component as described with reference to FIGS. 10 through 13.

Figure 17:
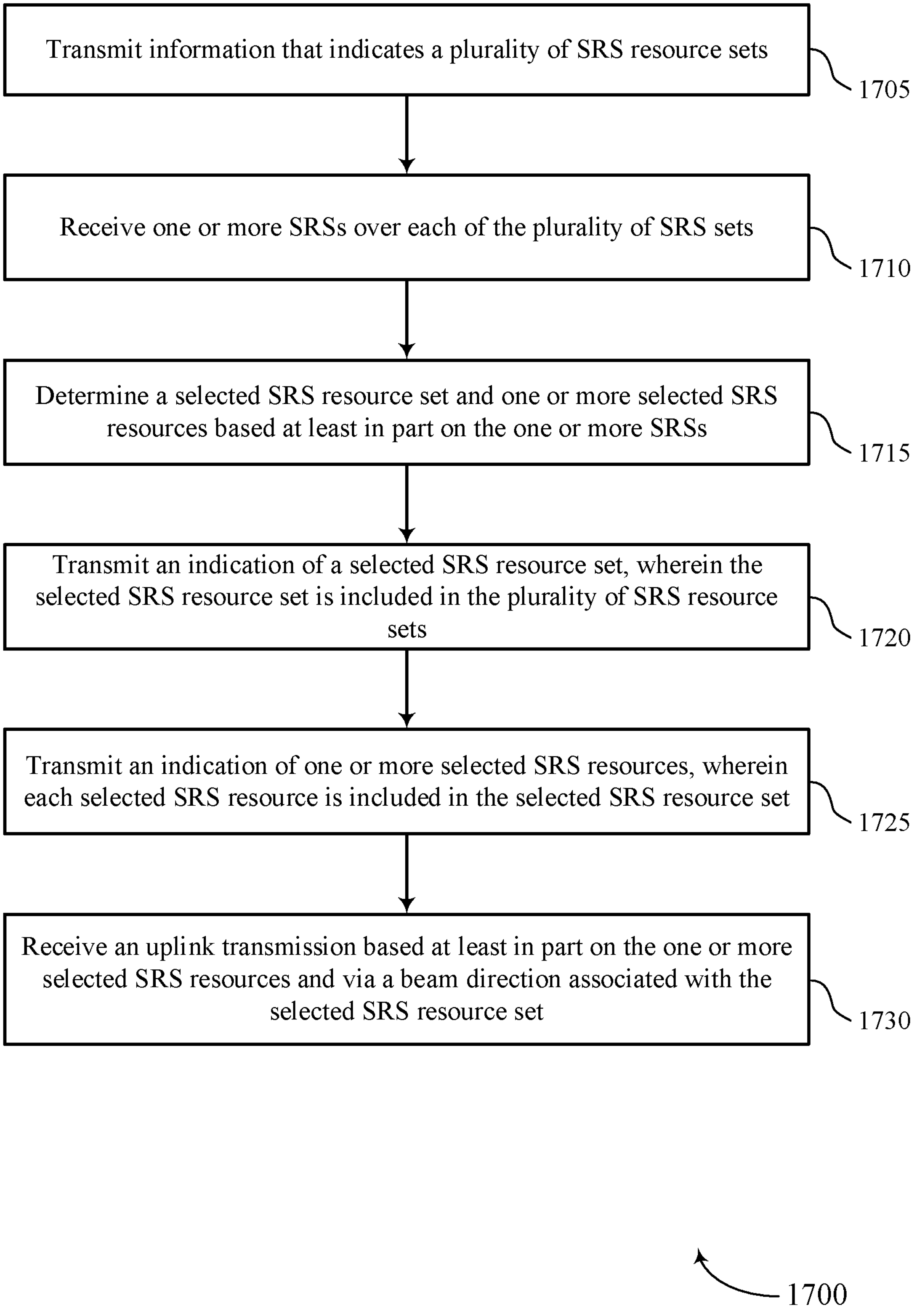

FIG. 17 shows a flowchart illustrating a method 1700 that supports reference signal configurations for uplink beam selection in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit information that indicates a plurality of SRS resource sets. The operations of 1705 may be performed according to the methods described herein. In some examples, aspects of the operations of 1705 may be performed by an SRS configuration manager as described with reference to FIGS. 10 through 13.

At 1710, the base station may receive one or more SRSs over each of the plurality of SRS sets. The operations of 1710 may be performed according to the methods described herein. In some examples, aspects of the operations of 1710 may be performed by an uplink reception component as described with reference to FIGS. 10 through 13.

At 1715, the base station may determine a selected SRS resource set and one or more selected SRS resources based at least in part on the one or more SRSs. The operations of 1715 may be performed according to the methods described herein. In some examples, aspects of the operations of 1715 may be performed by an SRS resource set component as described with reference to FIGS. 10 through 13.

At 1720, the base station may transmit an indication of a selected SRS resource set, wherein the selected SRS resource set is included in the plurality of SRS resource sets. The operations of 1720 may be performed according to the methods described herein. In some examples, aspects of the operations of 1720 may be performed by an SRS resource set component as described with reference to FIGS. 10 through 13.

At 1725, the base station may transmit an indication of one or more selected SRS resources, wherein each selected SRS resource is included in the selected SRS resource set. The operations of 1725 may be performed according to the methods described herein. In some examples, aspects of the operations of 1725 may be performed by an SRS resource component as described with reference to FIGS. 10 through 13.

At 1730, the base station may receive an uplink transmission based at least in part on the one or more selected SRS resources and via a beam direction associated with the selected SRS resource set. The operations of 1730 may be performed according to the methods described herein. In some examples, aspects of the operations of 1730 may be performed by an uplink reception component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: receiving information that indicates a plurality of SRS resource sets; receiving an indication of a selected SRS resource set, wherein the selected SRS resource set is included in the plurality of SRS resource sets; receiving an indication of one or more selected SRS resources, wherein each selected SRS resource is included in the selected SRS resource set; and transmitting an uplink transmission based at least in part on the one or more selected SRS resources and via a beam direction associated with the selected SRS resource set.

Aspect 2: The method of aspect 1, further comprising: receiving information that indicates a plurality of downlink reference signal resources, wherein each of the plurality of SRS resource sets is associated with a respective downlink reference signal resource of the plurality of downlink reference signal resources.

Aspect 3: The method of aspect 2, wherein transmitting the uplink transmission comprises: transmitting the uplink transmission via a beam direction corresponding to a respective downlink reference signal resource, of the plurality of downlink reference signal resources, that is associated with the selected SRS resource set.

Aspect 4: The method of any of aspects 2 through 3, wherein each of the plurality of downlink reference signal resource sets corresponds to a respective beam direction.

Aspect 5: The method of any of aspects 2 through 4, further comprising: receiving the respective downlink reference signal resource using a spatial domain transmission filter, wherein transmitting the uplink transmission via the beam direction corresponding to the respective downlink reference signal resource comprises transmitting the uplink transmission using the spatial domain transmission filter.

Aspect 6: The method of any of aspects 2 through 5, wherein the plurality of downlink reference signal resources comprises a plurality of CSI-RS resources.

Aspect 7: The method of any of aspects 1 through 6, further comprising: transmitting one or more SRSs over each of the plurality of SRS resource sets, wherein receiving the indication of the selected SRS resource set and the indication of the one or more selected SRS resources is based at least in part on transmitting the one or more SRSs.

Aspect 8: The method of any of aspects 1 through 7, wherein receiving the indication of the selected SRS resource set and receiving the indication of the one or more selected SRS resources comprises: receiving a DCI message, wherein a first field of the DCI message comprises the indication of the selected SRS resource set, and wherein a second field of the DCI message comprises the indication of the one or more selected SRS resources.

Aspect 9: The method of aspect 8, further comprising: determining a quantity of selected SRS resource sets based at least in part on a value of the first field; and ignoring one or more additional fields of the DCI message that are associated with selected SRS resources based at least in part on determining the quantity of selected SRS resource sets.

Aspect 10: The method of any of aspects 1 through 9, wherein receiving the indication of the selected SRS resource set and receiving the indication of the one or more selected SRS resources comprises: receiving a DCI message, wherein a first set of bits within a field of the DCI message comprises the indication of the selected SRS resource set, and wherein a second set of bits within the field of the DCI message comprises the indication of the one or more selected SRS resources.

Aspect 11: The method of aspect 10, wherein the first set of bits are more significant than the second set of bits.

Aspect 12: The method of any of aspects 1 through 11, wherein each of the plurality of SRS resource sets comprises a respective quantity of SRS resources; and a quantity of bits included in the indication of the one or more selected SRS resources is based at least in part on a largest respective quantity of SRS resources.

Aspect 13: The method of any of aspects 1 through 12, wherein receiving the indication of the selected SRS resource set and receiving the indication of the one or more selected SRS resources comprises: receiving a DCI message comprising a grant for the uplink transmission, wherein the uplink transmission is transmitted based at least in part on the grant.

Aspect 14: The method of any of aspects 1 through 13, wherein the one or more selected SRS resources correspond to one or more respective transmission layers; and transmitting the uplink transmission based at least in part on the one or more selected SRS resources comprises transmitting the uplink transmission via the one or more respective transmission layers.

Aspect 15: The method of any of aspects 1 through 14, further comprising: receiving an indication of a second selected SRS resource set, wherein the second selected SRS resource set is included in the plurality of SRS resource sets; receiving an indication of one or more second selected SRS resources, wherein each second selected SRS resource is included in the second selected SRS resource set; and transmitting the uplink transmission based at least in part on the one or more second selected SRS resources and via a second beam direction associated with the second selected SRS resource set.

Aspect 16. The method of aspect 15, where the second beam direction corresponds to a second respective downlink reference signal resource, of the plurality of downlink reference signal resources, that is associated with the second selected sounding reference signal resource set.

Aspect 17: The method of aspect 15, wherein the indication of the selected SRS resource set, the indication of the one or more selected SRS resources, the indication of the second selected SRS resource set, and the indication of the one or more second selected SRS resources are received within a grant for the uplink transmission; and the grant for the uplink transmission schedules multiple occasions of the uplink transmission.

Aspect 18: The method of aspect 17, wherein a first set of one or more occasions of the uplink transmission are transmitted via the beam direction and based at least in part on the one or more selected SRS resources; and a second set of one or more occasions of the uplink transmission are transmitted via the second beam direction and based at least in part on the one or more second selected SRS resources.

Aspect 19: The method of aspect 18, wherein an occasion of the uplink transmission included in the second set is transmitted after a first occasion of the uplink transmission included in the first set and before a second occasion of the uplink transmission included in the first set.

Aspect 20: The method of any of aspects 18 through 19, wherein the one or more selected SRS resources comprises a first quantity of reference signal resources and the one or more second selected SRS resources comprises a second quantity of reference signal resources that is smaller than the first quantity; and the indication of the selected SRS resource set, the indication of the one or more selected SRS resources, the indication of the second selected SRS resource set, and the indication of the one or more second selected SRS resources are received within a DCI message.

Aspect 21: The method of aspect 20, further comprising: identifying, within a field of the DCI message, an indication of a set of antenna ports; associating the set of antenna ports with the one or more selected SRS resources, wherein the uplink transmission in the first set of one or more occasions is transmitted based at least in part on the set of antenna ports; and associating a subset of the set of antenna ports with the one or more second selected SRS resources, wherein the uplink transmission in the second set of one or more occasions is transmitted based at least in part on the subset of the set of antenna ports.

Aspect 22: The method of any of aspects 15 through 21, wherein the uplink transmission is transmitted via the beam direction and via the second beam direction within a same transmission time interval.

Aspect 23: The method of any of aspects 15 through 22, wherein the beam direction is associated with a first transmission and reception point or a first panel; and the second beam direction is associated with a second transmission and reception point or a second panel.

Aspect 24: The method of any of aspects 15 through 23, wherein the indication of the selected SRS resource set, the indication of the one or more selected SRS resources, the indication of the second selected SRS resource set, and the indication of the one or more second selected SRS resources are received within a DCI message; a first field of the DCI message indicates the selected SRS resource set and the second selected SRS resource set; a second field of the DCI message indicates the one or more selected SRS resources; and a third field of the DCI message indicates the one or more second selected SRS resources.

Aspect 25: The method of any of aspects 15 through 24, wherein the indication of the selected SRS resource set, the indication of the one or more selected SRS resources, the indication of the second selected SRS resource set, and the indication of the one or more second selected SRS resources are received within a field of a DCI message; a first set of bits within the field indicates the selected SRS resource set and the second selected SRS resource set; and a second set of bits within the field indicates the one or more selected SRS resources and the one or more second selected SRS resources.

Aspect 26: The method of aspect 25, wherein the first set of bits are more significant than the second set of bits.

Aspect 27: The method of any of aspects 24 through 25, wherein the one or more selected SRS resources and the one or more second selected SRS resources each comprise a same quantity of reference signal resources.

Aspect 28: The method of any of aspects 1 through 27, wherein the uplink transmission comprises a PUSCH transmission.

Aspect 29: A method for wireless communication, comprising: transmitting information that indicates a plurality of SRS resource sets; transmitting an indication of a selected SRS resource set, wherein the selected SRS resource set is included in the plurality of SRS resource sets; transmitting an indication of one or more selected SRS resources, wherein each selected SRS resource is included in the selected SRS resource set; and receiving an uplink transmission based at least in part on the one or more selected SRS resources and via a beam direction associated with the selected SRS resource set.

Aspect 30: The method of aspect 29, further comprising: transmitting information that indicates a plurality of downlink reference signal resources, wherein each of the plurality of SRS resource sets is associated with a respective downlink reference signal resource of the plurality of downlink reference signal resources.

Aspect 31: The method of aspect 30, wherein receiving the uplink transmission comprises: receiving the uplink transmission via a beam direction corresponding to a respective downlink reference signal resource, of the plurality of downlink reference signal resources, that is associated with the selected SRS resource set.

Aspect 32: The method of any of aspects 30 through 31, wherein each of the plurality of downlink reference signal resource sets corresponds to a respective beam direction.

Aspect 33: The method of any of aspects 30 through 32, further comprising: transmitting the respective downlink reference signal resource using a spatial domain transmission filter, wherein receiving the uplink transmission via the beam direction corresponding to the respective downlink reference signal resource comprises receiving the uplink transmission using the spatial domain transmission filter.

Aspect 34: The method of any of aspects 30 through 33, wherein the plurality of downlink reference signal resources comprises a plurality of channel state information reference signal resources.

Aspect 35: The method of any of aspects 29 through 34, further comprising: receiving one or more SRSs over each of the plurality of SRS resource sets; and determining the selected SRS resource set and the one or more selected SRS resources based at least in part on the one or more SRSs.

Aspect 36: The method of any of aspects 29 through 35, wherein transmitting the indication of the selected SRS resource set and transmitting the indication of the one or more selected SRS resources comprises: transmitting a DCI message, wherein a first field of the DCI message comprises the indication of the selected SRS resource set, and wherein a second field of the DCI message comprises the indication of the one or more selected SRS resources.

Aspect 37: The method of aspect 36, further comprising: determining a quantity of selected SRS resource sets; and padding one or more additional fields of the DCI message that are associated with selected SRS resources based at least in part on determining the quantity of selected SRS resource sets.

Aspect 38: The method of any of aspects 29 through 37, wherein transmitting the indication of the selected SRS resource set and transmitting the indication of the one or more selected SRS resources comprises: transmitting a DCI message, wherein a first set of bits within a field of the DCI message comprises the indication of the selected SRS resource set, and wherein a second set of bits within the field of the DCI message comprises the indication of the one or more selected SRS resources.

Aspect 39: The method of aspect 38, wherein the first set of bits are more significant than the second set of bits.

Aspect 40: The method of any of aspects 29 through 39, wherein each of the plurality of SRS resource sets comprises a respective quantity of SRS resources; and a quantity of bits included in the indication of the one or more selected SRS resources is based at least in part on a largest respective quantity of SRS resources.

Aspect 41: The method of any of aspects 29 through 40, wherein transmitting the indication of the selected SRS resource set and transmitting the indication of the one or more selected SRS resources comprises: transmitting a DCI message comprising a grant for the uplink transmission, wherein the uplink transmission is transmitted based at least in part on the grant.

Aspect 42: The method of any of aspects 29 through 41, wherein the one or more selected SRS resources correspond to one or more respective transmission layers; and receiving the uplink transmission based at least in part on the one or more selected SRS resources comprises receiving the uplink transmission via the one or more respective transmission layers.

Aspect 43: The method of any of aspects 29 through 42, further comprising: transmitting an indication of a second selected SRS resource set, wherein the second selected SRS resource set is included in the plurality of SRS resource sets; transmitting an indication of one or more second selected SRS resources, wherein each second selected SRS resource is included in the second selected SRS resource set; and receiving the uplink transmission based at least in part on the one or more second selected SRS resources and via a second beam direction associated with the second selected SRS resource set.

Aspect 44: The method of aspect 43, wherein the second beam direction corresponds to a second respective downlink reference signal resource, of the plurality of downlink reference signal resources, that is associated with the second selected sounding reference signal resource set.

Aspect 45: The method of aspect 43, wherein the indication of the selected SRS resource set, the indication of the one or more selected SRS resources, the indication of the second selected SRS resource set, and the indication of the one or more second selected SRS resources are transmitted within a grant for the uplink transmission; and the grant for the uplink transmission schedules multiple occasions of the uplink transmission.

Aspect 46: The method of aspect 45, wherein a first set of one or more occasions of the uplink transmission are received via the beam direction and based at least in part on the one or more selected SRS resources; and a second set of one or more occasions of the uplink transmission are received via the second beam direction and based at least in part on the one or more second selected SRS resources.

Aspect 47: The method of aspect 46, wherein an occasion of the uplink transmission included in the second set is received after a first occasion of the uplink transmission included in the first set and before a second occasion of the uplink transmission included in the first set.

Aspect 48: The method of any of aspects 46 through 47, wherein the one or more selected SRS resources comprises a first quantity of reference signal resources and the one or more second selected SRS resources comprises a second quantity of reference signal resources that is smaller than the first quantity; and the indication of the selected SRS resource set, the indication of the one or more selected SRS resources, the indication of the second selected SRS resource set, and the indication of the one or more second selected SRS resources are received within a DCI message.

Aspect 49: The method of aspect 48, further comprising: including, within a field of the DCI message, an indication of a set of antenna ports, wherein the uplink transmission in the first set of one or more occasions is based at least in part on the set of antenna ports, and wherein the uplink transmission in the second set of one or more occasions is based at least in part on a subset of the set of antenna ports.

Aspect 50: The method of any of aspects 44 through 49, wherein the uplink transmission is received via the beam direction and via the second beam direction within a same transmission time interval.

Aspect 51: The method of any of aspects 44 through 49, wherein the beam direction is associated with a first transmission and reception point or a first panel; and the second beam direction is associated with a second transmission and reception point or a second panel.

Aspect 52: The method of any of aspects 44 through 51, wherein the indication of the selected SRS resource set, the indication of the one or more selected SRS resources, the indication of the second selected SRS resource set, and the indication of the one or more second selected SRS resources are transmitted within a DCI message; a first field of the DCI message indicates the selected SRS resource set and the second selected SRS resource set; a second field of the DCI message indicates the one or more selected SRS resources; and a third field of the DCI message indicates the one or more second selected SRS resources.

Aspect 53: The method of any of aspects 44 through 51, wherein the indication of the selected SRS resource set, the indication of the one or more selected SRS resources, the indication of the second selected SRS resource set, and the indication of the one or more second selected SRS resources are transmitted within a field of a DCI message; a first set of bits within the field indicates the selected SRS resource set and the second selected SRS resource set; and a second set of bits within the field indicates the one or more selected SRS resources and the one or more second selected SRS resources.

Aspect 54: The method of aspect 53, wherein the first set of bits are more significant than the second set of bits.

Aspect 55: The method of any of aspects 53 through 54, wherein the one or more selected SRS resources and the one or more second selected SRS resources each comprise a same quantity of reference signal resources.

Aspect 56: The method of any of aspects 29 through 55, wherein the uplink transmission comprises a PUSCH transmission.

Aspect 57: An apparatus for wireless communication, comprising at least one processor; memory coupled to the at least one processor; and instructions stored in the memory and executable by the at least one processor to cause the apparatus to perform a method of any of aspects 1 through 28.

Aspect 58: An apparatus for wireless communication, comprising at least one means for performing a method of any of aspects 1 through 28.

Aspect 59: A non-transitory computer-readable medium storing code for wireless communication, the code comprising instructions executable by at least one processor to perform a method of any of aspects 1 through 28.

Aspect 60: An apparatus for wireless communication, comprising at least one processor; memory coupled to the at least one processor; and instructions stored in the memory and executable by the at least one processor to cause the apparatus to perform a method of any of aspects 29 through 56.

Aspect 61: An apparatus for wireless communication, comprising at least one means for performing a method of any of aspects 29 through 56.

Aspect 62: A non-transitory computer-readable medium storing code for wireless communication, the code comprising instructions executable by at least one processor to perform a method of any of aspects 29 through 56.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:

receiving information that indicates a plurality of sounding reference signal resource sets;

receiving a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and transmitting the uplink transmission based at least in part on the one or more selected sounding reference signal resources and via a beam direction associated with the selected sounding reference signal resource set.

2. The method of claim 1, further comprising:

receiving information that indicates a plurality of downlink reference signal resources, wherein each of the plurality of sounding reference signal resource sets is associated with a respective downlink reference signal resource of the plurality of downlink reference signal resources.

3. The method of claim 2, wherein the beam direction corresponds to a respective downlink reference signal resource, of the plurality of downlink reference signal resources, that is associated with the selected sounding reference signal resource set.

4. The method of claim 2, wherein each of the plurality of downlink reference signal resources corresponds to a respective beam direction.

5. The method of claim 2, further comprising:

receiving the respective downlink reference signal resource using a spatial domain transmission filter, wherein transmitting the uplink transmission via the beam direction corresponding to the respective downlink reference signal resource comprises transmitting the uplink transmission using the spatial domain transmission filter.

6. The method of claim 2, wherein the plurality of downlink reference signal resources comprises a plurality of channel state information reference signal resources.

7. The method of claim 2, wherein the first field further comprises an indication of a second selected sounding reference signal resource set, wherein the second selected sounding reference signal resource set is included in the plurality of sounding reference signal resource sets, and wherein a third field of the downlink control information message comprises an indication of one or more second selected sounding reference signal resources, wherein each second selected sounding reference signal resource is included in the second selected sounding reference signal resource set, the method further comprising:

transmitting the uplink transmission based at least in part on the one or more second selected sounding reference signal resources and via a second beam direction associated with the second selected sounding reference signal resource set.

8. The method of claim 7, wherein the second beam direction corresponds to a second respective downlink reference signal resource, of the plurality of downlink reference signal resources, that is associated with the second selected sounding reference signal resource set.

9. The method of claim 7, wherein:

the indication of the selected sounding reference signal resource set, the indication of the one or more selected sounding reference signal resources, the indication of the second selected sounding reference signal resource set, and the indication of the one or more second selected sounding reference signal resources are received within a grant for the uplink transmission, the downlink control information message comprising the grant; and the grant for the uplink transmission schedules multiple occasions of the uplink transmission.

10. The method of claim 9, wherein:

a first set of one or more occasions of the uplink transmission are transmitted via the beam direction and based at least in part on the one or more selected sounding reference signal resources; and a second set of one or more occasions of the uplink transmission are transmitted via the second beam direction and based at least in part on the one or more second selected sounding reference signal resources.

11. The method of claim 10, wherein an occasion of the uplink transmission included in the second set of one or more occasions is transmitted after a first occasion of the uplink transmission included in the first set of one or more occasions and before a second occasion of the uplink transmission included in the first set of one or more occasions.

12. The method of claim 10, wherein:

the one or more selected sounding reference signal resources comprises a first quantity of reference signal resources and the one or more second selected sounding reference signal resources comprises a second quantity of reference signal resources that is smaller than the first quantity.

13. The method of claim 12, further comprising:

identifying, within a field of the downlink control information message, an indication of a set of antenna ports;

associating the set of antenna ports with the one or more selected sounding reference signal resources, wherein the uplink transmission in the first set of one or more occasions is transmitted based at least in part on the set of antenna ports; and associating a subset of the set of antenna ports with the one or more second selected sounding reference signal resources, wherein the uplink transmission in the second set of one or more occasions is transmitted based at least in part on the subset of the set of antenna ports.

14. The method of claim 7, wherein the uplink transmission is transmitted via the beam direction and via the second beam direction within a same transmission time interval.

15. The method of claim 7, wherein:

the beam direction is associated with a first transmission and reception point or a first panel; and the second beam direction is associated with a second transmission and reception point or a second panel.

16. The method of claim 7, wherein the one or more selected sounding reference signal resources and the one or more second selected sounding reference signal resources each comprise a same quantity of reference signal resources.

17. The method of claim 1, further comprising:

transmitting one or more sounding reference signals over each of the plurality of sounding reference signal resource sets, wherein receiving the downlink control information message is based at least in part on transmitting the one or more sounding reference signals.

18. The method of claim 1, further comprising:

determining a quantity of selected sounding reference signal resource sets based at least in part on a value of the first field; and ignoring one or more additional fields of the downlink control information message that are associated with selected sounding reference signal resources based at least in part on determining the quantity of selected sounding reference signal resource sets.

19. The method of claim 1, wherein:

each of the plurality of sounding reference signal resource sets comprises a respective quantity of sounding reference signal resources; and a quantity of bits included in the indication of the one or more selected sounding reference signal resources is based at least in part on a largest respective quantity of sounding reference signal resources.

20. The method of claim 1, wherein the downlink control information message comprises a grant for the uplink transmission, wherein the uplink transmission is transmitted based at least in part on the grant.

21. The method of claim 1, wherein:

the one or more selected sounding reference signal resources correspond to one or more respective transmission layers; and transmitting the uplink transmission based at least in part on the one or more selected sounding reference signal resources comprises transmitting the uplink transmission via the one or more respective transmission layers.

22. The method of claim 1, wherein the uplink transmission comprises a physical uplink shared channel transmission.

23. The method of claim 1, wherein the plurality of sounding reference signal resource sets are configured for non-codebook usage.

24. A method for wireless communication, comprising:

transmitting information that indicates a plurality of sounding reference signal resource sets;

transmitting a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and receiving the uplink transmission based at least in part on the one or more selected sounding reference signal resources and via a beam direction associated with the selected sounding reference signal resource set.

25. The method of claim 24, further comprising:

transmitting information that indicates a plurality of downlink reference signal resources, wherein each of the plurality of sounding reference signal resource sets is associated with a respective downlink reference signal resource of the plurality of downlink reference signal resources.

26. The method of claim 25, wherein the beam direction corresponds to a respective downlink reference signal resource, of the plurality of downlink reference signal resources, that is associated with the selected sounding reference signal resource set.

27. The method of claim 25, wherein each of the plurality of downlink reference signal resources corresponds to a respective beam direction.

28. The method of claim 25, further comprising:

transmitting the respective downlink reference signal resource using a spatial domain transmission filter, wherein receiving the uplink transmission via the beam direction corresponding to the respective downlink reference signal resource comprises receiving the uplink transmission using the spatial domain transmission filter.

29. The method of claim 25, wherein the plurality of downlink reference signal resources comprises a plurality of channel state information reference signal resources.

30. The method of claim 25, wherein the first field comprises an indication of a second selected sounding reference signal resource set, wherein the second selected sounding reference signal resource set is included in the plurality of sounding reference signal resource sets, and wherein a third field of the downlink control information message comprises an indication of one or more second selected sounding reference signal resources, wherein each second selected sounding reference signal resource is included in the second selected sounding reference signal resource set, the method further comprising:

receiving the uplink transmission based at least in part on the one or more second selected sounding reference signal resources and via a second beam direction associated with the second selected sounding reference signal resource set.

31. The method of claim 30, wherein the second beam direction corresponds to a second respective downlink reference signal resource, of the plurality of downlink reference signal resources, that is associated with the second selected sounding reference signal resource set.

32. The method of claim 30, wherein:

the indication of the selected sounding reference signal resource set, the indication of the one or more selected sounding reference signal resources, the indication of the second selected sounding reference signal resource set, and the indication of the one or more second selected sounding reference signal resources are transmitted within a grant for the uplink transmission, the downlink control information message comprising the grant; and the grant for the uplink transmission schedules multiple occasions of the uplink transmission.

33. The method of claim 32, wherein:

a first set of one or more occasions of the uplink transmission are received via the beam direction and based at least in part on the one or more selected sounding reference signal resources; and a second set of one or more occasions of the uplink transmission are received via the second beam direction and based at least in part on the one or more second selected sounding reference signal resources.

34. The method of claim 33, wherein an occasion of the uplink transmission included in the second set of one or more occasions is received after a first occasion of the uplink transmission included in the first set of one or more occasions and before a second occasion of the uplink transmission included in the first set of one or more occasions.

35. The method of claim 33, wherein:

the one or more selected sounding reference signal resources comprises a first quantity of reference signal resources and the one or more second selected sounding reference signal resources comprises a second quantity of reference signal resources that is smaller than the first quantity.

36. The method of claim 35, further comprising:

including, within a field of the downlink control information message, an indication of a set of antenna ports, wherein the uplink transmission in the first set of one or more occasions is based at least in part on the set of antenna ports, and wherein the uplink transmission in the second set of one or more occasions is based at least in part on a subset of the set of antenna ports.

37. The method of claim 30, wherein the uplink transmission is received via the beam direction and via the second beam direction within a same transmission time interval.

38. The method of claim 30, wherein:

the beam direction is associated with a first transmission and reception point or a first panel; and the second beam direction is associated with a second transmission and reception point or a second panel.

39. The method of claim 30, wherein the one or more selected sounding reference signal resources and the one or more second selected sounding reference signal resources each comprise a same quantity of reference signal resources.

40. The method of claim 24, further comprising:

receiving one or more sounding reference signals over each of the plurality of sounding reference signal resource sets; and determining the selected sounding reference signal resource set and the one or more selected sounding reference signal resources based at least in part on the one or more sounding reference signals.

41. The method of claim 24, further comprising:

determining a quantity of selected sounding reference signal resource sets; and padding one or more additional fields of the downlink control information message that are associated with selected sounding reference signal resources based at least in part on determining the quantity of selected sounding reference signal resource sets.

42. The method of claim 24, wherein:

each of the plurality of sounding reference signal resource sets comprises a respective quantity of sounding reference signal resources; and a quantity of bits included in the indication of the one or more selected sounding reference signal resources is based at least in part on a largest respective quantity of sounding reference signal resources.

43. The method of claim 24, wherein the downlink control information message comprises a grant for the uplink transmission, wherein the uplink transmission is transmitted based at least in part on the grant.

44. The method of claim 24, wherein:

the one or more selected sounding reference signal resources correspond to one or more respective transmission layers; and receiving the uplink transmission based at least in part on the one or more selected sounding reference signal resources comprises receiving the uplink transmission via the one or more respective transmission layers.

45. The method of claim 24, wherein the uplink transmission comprises a physical uplink shared channel transmission.

46. The method of claim 24, wherein the plurality of sounding reference signal resource sets are configured for non-codebook usage.

47. An apparatus for wireless communication, comprising:

at least one processor, memory coupled with the at least one processor; and instructions stored in the memory and executable by the at least one processor to cause the apparatus to:

receive information that indicates a plurality of sounding reference signal resource sets;

receive a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and transmit the uplink transmission based at least in part on the one or more selected sounding reference signal resources and via a beam direction associated with the selected sounding reference signal resource set.

48. The apparatus of claim 47, wherein the instructions are further executable by the at least one processor to cause the apparatus to:

receive information that indicates a plurality of downlink reference signal resources, wherein each of the plurality of sounding reference signal resource sets is associated with a respective downlink reference signal resource of the plurality of downlink reference signal resources.

49. The apparatus of claim 48, wherein the beam direction corresponds to a respective downlink reference signal resource, of the plurality of downlink reference signal resources, that is associated with the selected sounding reference signal resource set.

50. The apparatus of claim 48, wherein each of the plurality of downlink reference signal resources corresponds to a respective beam direction.

51. The apparatus of claim 48, wherein the plurality of downlink reference signal resources comprises a plurality of channel state information reference signal resources.

52. The apparatus of claim 48, wherein the first field comprises an indication of a second selected sounding reference signal resource set, wherein the second selected sounding reference signal resource set is included in the plurality of sounding reference signal resource sets, and wherein a third field of the downlink control information message comprises an indication of one or more second selected sounding reference signal resources, wherein each second selected sounding reference signal resource is included in the second selected sounding reference signal resource set, and wherein the instructions are further executable by the at least one processor to cause the apparatus to:

transmit the uplink transmission based at least in part on the one or more second selected sounding reference signal resources and via a second beam direction associated with the second selected sounding reference signal resource set.

53. The apparatus of claim 52, wherein the second beam direction corresponds to a second respective downlink reference signal resource, of the plurality of downlink reference signal resources, that is associated with the second selected sounding reference signal resource set.

54. The apparatus of claim 52, wherein the instructions are further executable by the at least one processor to cause the apparatus to:

receive the indication of the selected sounding reference signal resource set, the indication of the one or more selected sounding reference signal resources, the indication of the second selected sounding reference signal resource set, and the indication of the one or more second selected sounding reference signal resources within a grant for the uplink transmission, the downlink control information message comprising the grant; and the grant for the uplink transmission schedules multiple occasions of the uplink transmission.

55. The apparatus of claim 54, wherein the instructions are further executable by the at least one processor to cause the apparatus to:

transmit a first set of one or more occasions of the uplink transmission via the beam direction and based at least in part on the one or more selected sounding reference signal resources; and transmit a second set of one or more occasions of the uplink transmission via the second beam direction and based at least in part on the one or more second selected sounding reference signal resources.

56. The apparatus of claim 55, wherein the instructions are further executable by the at least one processor to cause the apparatus to:

transmit an occasion of the uplink transmission included in the second set of one or more occasions after a first occasion of the uplink transmission included in the first set of one or more occasions and before a second occasion of the uplink transmission included in the first set of one or more occasions.

57. The apparatus of claim 52, wherein:

the beam direction is associated with a first transmission and reception point or a first panel; and the second beam direction is associated with a second transmission and reception point or a second panel.

58. The apparatus of claim 47, wherein the instructions are further executable by the at least one processor to cause the apparatus to:

transmit one or more sounding reference signals over each of the plurality of sounding reference signal resource sets, wherein receiving the downlink control information message is based at least in part on transmitting the one or more sounding reference signals.

59. The apparatus of claim 47, wherein the downlink control information message comprises a grant for the uplink transmission, wherein the uplink transmission is transmitted based at least in part on the grant.

60. The apparatus of claim 47, wherein:

the one or more selected sounding reference signal resources correspond to one or more respective transmission layers; and to transmit the uplink transmission based at least in part on the one or more selected sounding reference signal resources, the instructions are executable by the at least one processor to cause the apparatus to transmit the uplink transmission via the one or more respective transmission layers.

61. An apparatus for wireless communication, comprising:

at least one processor, memory coupled with the at least one processor; and instructions stored in the memory and executable by the at least one processor to cause the apparatus to:

transmit information that indicates a plurality of sounding reference signal resource sets;

transmit a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and receive the uplink transmission based at least in part on the one or more selected sounding reference signal resources and via a beam direction associated with the selected sounding reference signal resource set.

62. The apparatus of claim 61, wherein the instructions are further executable by the at least one processor to cause the apparatus to:

transmit information that indicates a plurality of downlink reference signal resources, wherein each of the plurality of sounding reference signal resource sets is associated with a respective downlink reference signal resource of the plurality of downlink reference signal resources.

63. The apparatus of claim 62, wherein the beam direction corresponds to a respective downlink reference signal resource, of the plurality of downlink reference signal resources, that is associated with the selected sounding reference signal resource set.

64. The apparatus of claim 61, wherein the instructions are further executable by the at least one processor to cause the apparatus to:

receive one or more sounding reference signals over each of the plurality of sounding reference signal resource sets; and determine the selected sounding reference signal resource set and the one or more selected sounding reference signal resources based at least in part on the one or more sounding reference signals.

65. The apparatus of claim 61, wherein:

the one or more selected sounding reference signal resources correspond to one or more respective transmission layers; and to receive the uplink transmission based at least in part on the one or more selected sounding reference signal resources, the instructions are executable by the at least one processor to cause the apparatus to receive the uplink transmission via the one or more respective transmission layers.

66. The apparatus of claim 61, wherein the first field comprises an indication of a second selected sounding reference signal resource set, wherein the second selected sounding reference signal resource set is included in the plurality of sounding reference signal resource sets, and wherein a third field of the downlink control information message comprises an indication of one or more second selected sounding reference signal resources, wherein each second selected sounding reference signal resource is included in the second selected sounding reference signal resource set, and wherein the instructions are further executable by the at least one processor to cause the apparatus to:

receive the uplink transmission based at least in part on the one or more second selected sounding reference signal resources and via a second beam direction associated with the second selected sounding reference signal resource set.

67. The apparatus of claim 66, wherein the instructions are further executable by the at least one processor to cause the apparatus to:

transmit the indication of the selected sounding reference signal resource set, the indication of the one or more selected sounding reference signal resources, the indication of the second selected sounding reference signal resource set, and the indication of the one or more second selected sounding reference signal resources within a grant for the uplink transmission, the downlink control information message comprising the grant; and the grant for the uplink transmission schedules multiple occasions of the uplink transmission.

68. The apparatus of claim 66, wherein:

the beam direction is associated with a first transmission and reception point or a first panel; and the second beam direction is associated with a second transmission and reception point or a second panel.

69. An apparatus for wireless communication, comprising:

means for receiving information that indicates a plurality of sounding reference signal resource sets;

means for receiving a downlink control information message that schedules an uplink transmission, wherein a first field of the downlink control information message comprises an indication of a selected sounding reference signal resource set, wherein the selected sounding reference signal resource set is included in the plurality of sounding reference signal resource sets and wherein a second field of the downlink control information message comprises an indication of one or more selected sounding reference signal resources, wherein each selected sounding reference signal resource is included in the selected sounding reference signal resource set; and means for transmitting the uplink transmission based at least in part on the one or more selected sounding reference signal resources and via a beam direction associated with the selected sounding reference signal resource set.

70. An apparatus for wireless communication, comprising:

means for transmitting information that indicates a plurality of sounding reference signal resource sets;

means for transmitting a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and means for receiving the uplink transmission based at least in part on the one or more selected sounding reference signal resources and via a beam direction associated with the selected sounding reference signal resource set.

71. A non-transitory computer-readable medium storing code for wireless communication, the code comprising instructions executable by a processor to:

receive information that indicates a plurality of sounding reference signal resource sets;

receive a downlink control information message that schedules an uplink transmission, wherein a first field of the downlink control information message comprises an indication of a selected sounding reference signal resource set, wherein the selected sounding reference signal resource set is included in the plurality of sounding reference signal resource sets, and wherein a second field of the downlink control information message comprises an indication of one or more selected sounding reference signal resources, wherein each selected sounding reference signal resource is included in the selected sounding reference signal resource set; and transmit the uplink transmission based at least in part on the one or more selected sounding reference signal resources and via a beam direction associated with the selected sounding reference signal resource set.

72. A non-transitory computer-readable medium storing code for wireless communication, the code comprising instructions executable by a processor to:

transmit information that indicates a plurality of sounding reference signal resource sets;

transmit a downlink control information message that schedules an uplink transmission, wherein a first field of the downlink control information message comprises an indication of a selected sounding reference signal resource set, wherein the selected sounding reference signal resource set is included in the plurality of sounding reference signal resource sets and wherein a second field of the downlink control information message comprises an indication of one or more selected sounding reference signal resources, wherein each selected sounding reference signal resource is included in the selected sounding reference signal resource set; and receive the uplink transmission based at least in part on the one or more selected sounding reference signal resources and via a beam direction associated with the selected sounding reference signal resource set.

* * * * *